United States Patent
Yang et al.

(10) Patent No.: US 9,848,417 B2
(45) Date of Patent: Dec. 19, 2017

(54) METHOD FOR TRANSRECEIVING SIGNALS AND APPARATUS FOR SAME

(71) Applicant: LG ELECTRONICS INC., Seoul (KR)

(72) Inventors: Suckchel Yang, Anyang-si (KR);
Dongyoun Seo, Anyang-si (KR);
Bonghoe Kim, Anyang-si (KR);
Joonkui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/340,758

(22) Filed: Nov. 1, 2016

(65) Prior Publication Data

US 2017/0048836 A1 Feb. 16, 2017

Related U.S. Application Data

(63) Continuation of application No. 14/375,759, filed as application No. PCT/KR2013/001069 on Feb. 12, 2013, now Pat. No. 9,531,519.

(Continued)

(51) Int. Cl.
*H04B 1/56* (2006.01)
*H04W 72/04* (2009.01)
(Continued)

(52) U.S. Cl.
CPC ............. *H04W 72/042* (2013.01); *H04J 3/00* (2013.01); *H04L 1/1812* (2013.01);
(Continued)

(58) Field of Classification Search
CPC . H04L 5/14; H04L 5/00; H04L 5/0055; H04L 5/1469; H04L 1/1861;
(Continued)

(56) References Cited

U.S. PATENT DOCUMENTS

2009/0249153 A1* 10/2009 Zhang .................. H04L 1/1887
714/748
2010/0246455 A1* 9/2010 Nangia ................. H04L 1/1822
370/280
(Continued)

FOREIGN PATENT DOCUMENTS

CN 101989897 3/2011
CN 102075949 5/2011
(Continued)

OTHER PUBLICATIONS

The State Intellectual Property Office of the People's Republic of China Application Serial No. 201380008935.8, Office Action dated Nov. 2, 2016, 9 pages.

(Continued)

*Primary Examiner* — Andrew Chriss
*Assistant Examiner* — Rasha Fayed
(74) *Attorney, Agent, or Firm* — Lee Hong Degerman Kang Waimey

(57) ABSTRACT

The present invention relates to a wireless communication system. More particularly, the present invention relates to a method for transmitting an uplink signal in a wireless communication system supporting carrier aggregation (CA), and to an apparatus for same, comprising the steps of: establishing a first cell having a first time division duplex (TDD) uplink-downlink (UL-DL) configuration and a second cell having a second TDD UL-DL configuration; receiving data through a DL subframe of the first cell; and transmitting reception reply information with respect to the data through a UL subframe of the second cell.

10 Claims, 15 Drawing Sheets

Related U.S. Application Data

(60) Provisional application No. 61/597,115, filed on Feb. 9, 2012, provisional application No. 61/606,457, filed on Mar. 4, 2012, provisional application No. 61/617,663, filed on Mar. 30, 2012, provisional application No. 61/648,615, filed on May 18, 2012, provisional application No. 61/655,470, filed on Jun. 4, 2012, provisional application No. 61/696,218, filed on Sep. 2, 2012, provisional application No. 61/705,135, filed on Sep. 24, 2012, provisional application No. 61/709,978, filed on Oct. 4, 2012, provisional application No. 61/718,714, filed on Oct. 26, 2012, provisional application No. 61/731,490, filed on Nov. 30, 2012, provisional application No. 61/753,937, filed on Jan. 18, 2013.

(51) Int. Cl.
 H04J 3/00 (2006.01)
 H04L 5/00 (2006.01)
 H04L 1/18 (2006.01)
 H04L 5/14 (2006.01)

(52) U.S. Cl.
 CPC .......... *H04L 1/1819* (2013.01); *H04L 1/1822* (2013.01); *H04L 1/1835* (2013.01); *H04L 1/1854* (2013.01); *H04L 1/1861* (2013.01); *H04L 1/1864* (2013.01); *H04L 1/1896* (2013.01); *H04L 5/0055* (2013.01); *H04L 5/14* (2013.01); *H04L 5/1469* (2013.01); *H04W 72/0413* (2013.01)

(58) Field of Classification Search
 CPC ... H04L 1/1822; H04L 1/1819; H04L 1/1835; H04L 1/1854; H04L 1/0026; H04L 63/162; H04L 63/08; H04B 7/14; H04B 7/2656; H04B 7/15528; H04W 74/04; H04W 74/0866; H04W 74/0833; H04W 74/008; H04W 72/0413; H04W 72/042; H04W 72/005; H04W 72/0446; H04W 48/02; H04W 8/20; H04W 8/24; H04W 12/12
 USPC ....... 370/280, 229, 230, 231, 235, 310, 328, 370/338, 351, 428, 279; 455/403, 422.1
 See application file for complete search history.

(56) References Cited

U.S. PATENT DOCUMENTS

| | | | | |
|---|---|---|---|---|
| 2011/0105050 | A1* | 5/2011 | Khandekar | H04L 5/001 455/68 |
| 2012/0087396 | A1* | 4/2012 | Nimbalker | H04L 1/1822 375/219 |
| 2012/0113841 | A1* | 5/2012 | Todd | H04L 29/12367 370/252 |
| 2013/0051289 | A1* | 2/2013 | Hsieh | H04L 1/1845 370/280 |
| 2013/0114472 | A1* | 5/2013 | Tamaki | H04L 1/1854 370/280 |
| 2013/0121304 | A1* | 5/2013 | Nory | H04L 1/1861 370/330 |
| 2013/0155898 | A1* | 6/2013 | Yin | H04L 1/0026 370/254 |
| 2013/0163543 | A1* | 6/2013 | Freda | H04W 72/0406 370/329 |
| 2015/0016315 | A1 | 1/2015 | Yang et al. | |

FOREIGN PATENT DOCUMENTS

| | | |
|---|---|---|
| CN | 102255718 | 11/2011 |
| KR | 10-2010-0133916 | 12/2010 |
| KR | 10-2011-0073689 | 6/2011 |
| KR | 10-2011-0090784 | 8/2011 |
| KR | 10-2012-0005544 | 1/2012 |
| WO | 2010/019524 | 2/2010 |

OTHER PUBLICATIONS

CATT, "TDD inter-band carrier aggregation," 3GPP TSG RAN WG1 Meeting #68, R1-120091, Feb. 2012, 4 pages.
Nokia Siemens Networks, et al., "Views on inter-band CA with different TDD configurations on different bands," 3GPP TSG-RAN WG1 Meeting #67, R1-114309, Nov. 2011, 7 pages.
Ericsson, et al., "Remaining PDSCH HARQ timing issues in aggregation of TDD carriers with different UL/DL configurations and cross-carrier scheduling," 3GPP TSG-RAN WG1 #70, R1-123610, Aug. 2012, 5 pages.
Ericsson, et al., "Assumptions for further evaluation of LTE TDD traffic adaptation," 3GPP TSG-RAN WG1 #68, R1-120782, Feb. 2012, 4 pages.
MediaTek Inc., "HARQ Feedback Mechanism in CA with Different TDD Configurations," 3GPP TSG-RAN WG1 Meeting #66bis, R1-113047, Oct. 2011, 5 pages.
Ericsson, et al., "Remaining issues in general frame work for aggregation of carriers with different UL/DL configurations," 3GPP TSG-RAN WG1 #68, R1-120070, Feb. 2012, 4 pages.
European Patent Office Application Serial No. 13747055.5, Search Report dated Sep. 18, 2015, 10 pages.
PCT International Application No. PCT/KR2013/001069, Written Opinion of the International Searching Authority dated Jun. 10, 2013, 1 page.

\* cited by examiner

PDSCH-ACK/NACK timing (UL-DL configuration #1)

PHICH/UL grant-PUSCH timing (UL-DL configuration #1)

PUSCH-PHICH/UL grant timing (UL-DL configuration #1)

HARQ processes in UL-DL configuration #1

FIG. 13
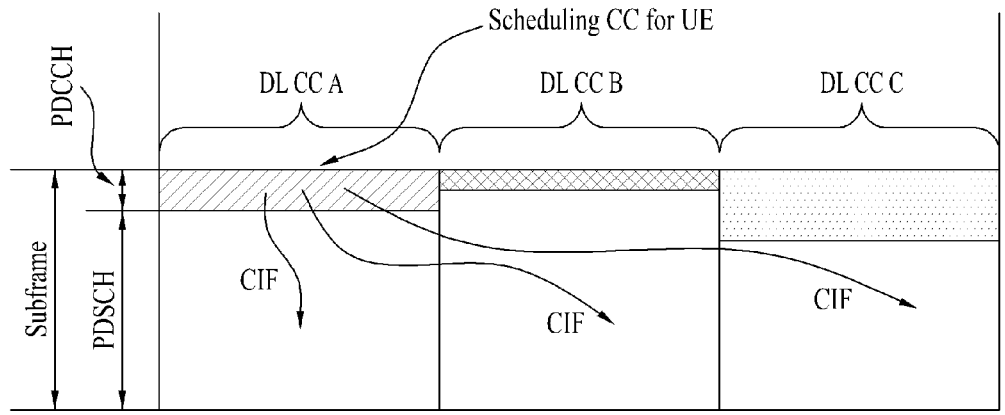
FIG. 14
| SF index | 0 | 1 | 2 | 3 | 4 | 5 | 6 | 7 | 8 | 9 |
|---|---|---|---|---|---|---|---|---|---|---|
| PCC (Cfg 3) | D | S | U | U | U | D | D | D | D | D |
| DL association set index | | | (7,6,11) | (6,5) | (5,4) | | | | | |
| SCC (Cfg 3) | D | S | U | U | U | D | D | D | D | D |
|---|---|---|---|---|---|---|---|---|---|---|
| DL association set index | | | (7,6,11) | (6,5) | (5,4) | | | | | |
FIG. 15
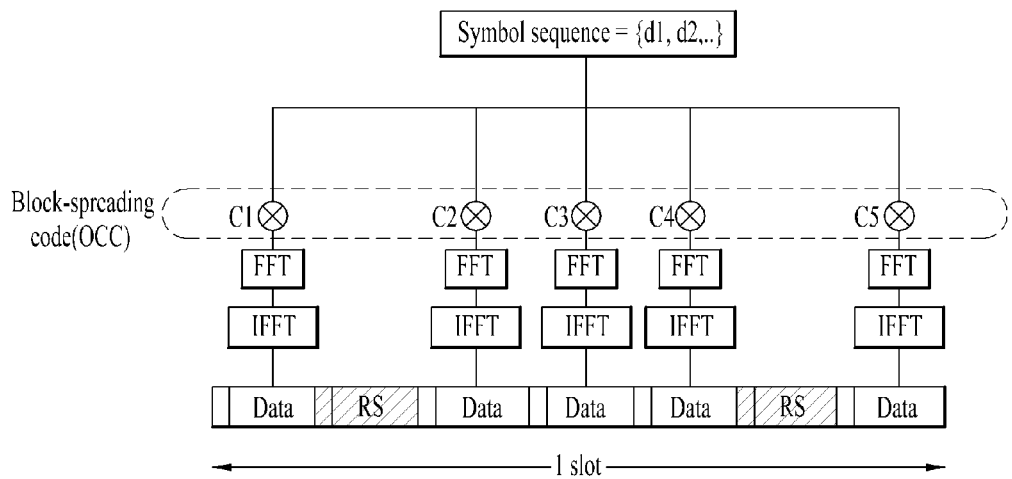

METHOD FOR TRANSRECEIVING SIGNALS AND APPARATUS FOR SAME

CROSS-REFERENCE TO RELATED APPLICATIONS

This application is a continuation of U.S. patent application Ser. No. 14/375,759, filed on Jul. 30, 2014, now U.S. Pat. No. 9,531,519, which is the National Stage filing under 35 U.S.C. 371 of International Application No. PCT/KR2013/001069, filed on Feb. 12, 2013, which claims the benefit of U.S. Provisional Application No. 61/597,115, filed on Feb. 9, 2012, 61/606,457, filed on Mar. 4, 2012, 61/617,663, filed on Mar. 30, 2012, 61/648,615, filed on May 18, 2012, 61/655,470, filed on Jun. 4, 2012, 61/696,218, filed on Sep. 2, 2012, 61/705,135, filed on Sep. 24, 2012, 61/709,978, filed on Oct. 4, 2012, 61/718,714, filed on Oct. 26, 2012, 61/731,490, filed on Nov. 30, 2012 and 61/753,937, filed on Jan. 18, 2013, the contents of which are all hereby incorporated by reference herein in their entirety.

TECHNICAL FIELD

The present invention relates to a wireless communication system and, more particularly, to a method for transmitting and receiving a signal in a multi-carrier system supporting time division duplex (TDD) and an apparatus therefor.

BACKGROUND ART

Wireless communication systems have been widely deployed in order to provide various types of communication services such as voice or data services. Generally, a wireless communication system is a multiple access system capable of supporting communication with multiple users by sharing available system resources (bandwidth, transmit power, etc.). Multiple access systems include, for example, a code division multiple access (CDMA) system, a frequency division multiple access (FDMA) system, a time division multiple access (TDMA) system, an orthogonal frequency division multiple access (OFDMA) system, and a single-carrier frequency division multiple access (SC-FDMA) system.

DISCLOSURE

Technical Problem

An object of the present invention is to provide method for efficiently transmitting and receiving a signal in a wireless communication system and an apparatus therefor. Another object of the present invention is to provide a method for efficiently transmitting and receiving a signal in a multi-carrier system supporting TDD and an apparatus therefor. Still another object of the present invention is to provide a method for reusing legacy signal transmission and reception timing during signal transmission and reception timing configuration in a multi-carrier system supporting TDD and an apparatus therefor. A further object of the present invention is to provide a method for efficiently operating a HARQ process in a multi-carrier system supporting TDD and an apparatus therefor.

The technical objects that can be achieved through the present invention are not limited to what has been particularly described hereinabove and other technical objects not described herein will be more clearly understood by persons skilled in the art from the following detailed description.

Technical Solution

In an aspect of the present invention, provided herein is a method for transmitting an uplink signal by a communication apparatus in a wireless communication system supporting carrier aggregation (CA), including configuring a first cell of a first time division duplex (TDD) uplink (UL)-downlink (DL) configuration and a second cell of a second TDD UL-DL configuration; receiving data through a DL subframe of the first cell; and transmitting acknowledgement information for the data through a UL subframe of the second cell, wherein a relationship between the DL subframe and the UL subframe is determined by a parameter value configured in a specific TDD UL-DL configuration within a TDD UL-DL configuration set, the specific TDD UL-DL configuration is a TDD UL-DL configuration having a smallest number of DL subframes among one or more TDD UL-DL configurations in which DL is configured in all subframes configured as DL configured in the first cell or the second cell, and timing for transmitting the acknowledgement information is configured only at subframe timing at which a subframe combination of the second cell and the first cell is (DL subframe, DL or special subframe) or (special subframe, special subframe).

In an aspect of the present invention, provided herein is a communication apparatus for transmitting an uplink signal in a wireless communication system supporting carrier aggregation (CA), including a radio frequency (RF) unit; and a processor, wherein the processor is configured to configure a first cell of a first time division duplex (TDD) uplink (UL)-downlink (DL) configuration and a second cell of a second TDD UL-DL configuration, receive data through a DL subframe of the first cell, and transmit acknowledgement information for the data through a UL subframe of the second cell, a relationship between the DL subframe and the UL subframe is determined by a parameter value configured in a specific TDD UL-DL configuration within a TDD UL-DL configuration set, the specific TDD UL-DL configuration is a TDD UL-DL configuration having a smallest number of DL subframes among one or more TDD UL-DL configurations in which DL is configured in all subframes configured as DL configured in the first cell or the second cell, and timing for transmitting the acknowledgement information is configured only at subframe timing at which a subframe combination of the second cell and the first cell is (DL subframe, DL or special subframe) or (special subframe, special subframe).

The TDD UL-DL configuration set may include a plurality of TDD UL-DL configurations defined as follows:

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Here, D may denote a DL subframe, S may denote a special subframe, and U may denote a UL subframe.

The DL subframe may be subframe #n-k (where k∈K), the UL subframe may be subframe #n, K:{$k_0, k_1, \ldots k_{M-1}$} may be defined according to TDD UL-DL configurations by the following table, and M may be an integer equal to or greater than 1:

| TDD UL-DL Configuration | \multicolumn{10}{c}{Subframe n} |
|---|---|---|---|---|---|---|---|---|---|---|

| TDD UL-DL Configuration | 0 | 1 | 2 | 3 | 4 | 5 | 6 | 7 | 8 | 9 |
|---|---|---|---|---|---|---|---|---|---|---|
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —. |

The first cell may be a secondary cell and the second cell may be a primary cell.

The first TDD UL-DL configuration may be different from the second TDD UL-DL configuration.

The communication apparatus may be configured to operate in a half duplex time division duplex (HD-TDD) CA.

Advantageous Effects

According to the present invention, a signal can be efficiently transmitted and received in a wireless communication system. A signal can also be efficiently transmitted and received in a multi-carrier system supporting TDD. In addition, legacy signal transmission and reception timing can be reused during signal transmission and reception timing configuration in a multi-carrier system supporting TDD. Furthermore, a HARQ process can be efficiently operated in a multi-carrier system supporting TDD.

The effects that can be achieved through the present invention are not limited to what has been particularly described hereinabove and other advantages not described herein will be more clearly understood by persons skilled in the art from the following detailed description.

DESCRIPTION OF DRAWINGS

The accompanying drawings, which are included to provide a further understanding of the invention, illustrate embodiments of the invention and together with the description serve to explain the principle of the invention.

FIG. 13 illustrates scheduling when a plurality of carriers is aggregated.

FIG. 14 illustrates a method for transmitting ACK/NACK information using channel selection in a legacy CA TDD system.

FIG. 15 illustrates the structure of PUCCH format 3 of a slot level.

BEST MODE

The following technology can be used in various wireless access systems such as systems for code division multiple access (CDMA), frequency division multiple access (FDMA), time division multiple access (TDMA), orthogonal frequency division multiple access (OFDMA), single carrier frequency division multiple access (SC-FDMA), etc. CDMA may be implemented by radio technology such as universal terrestrial radio access (UTRA) or CDMA2000. TDMA may be implemented by radio technology such as global system for mobile communications (GSM)/general packet radio service (GPRS)/enhanced data rates for GSM evolution (EDGE). 01-DMA may be implemented by radio technology such as IEEE 802.11 (Wi-Fi), IEEE 802.16 (WiMAX), IEEE 802-20, evolved-UTRA (E-UTRA), etc. UTRA is a part of universal mobile telecommunication system (UMTS). $3^{rd}$ generation partnership project (3GPP) long term evolution (LTE) is a part of evolved-UMTS (E-UMTS) using E-UTRA. 3GPP LTE employs OFDMA for downlink and SC-FDMA for uplink. LTE-Advanced (LTE-A) is an evolution of 3GPP LTE.

While the following embodiments of the present invention mainly describe 3GPP LTE/LTE-A in order to clarify the description, technical spirits of the present invention are not limited to the embodiments of the present invention described herein. Specific terms disclosed in the following description are provided to aid in understanding the present invention, and the use of these specific terms may be changed to other formats within the technical scope or spirit of the present invention.

Figure 1:
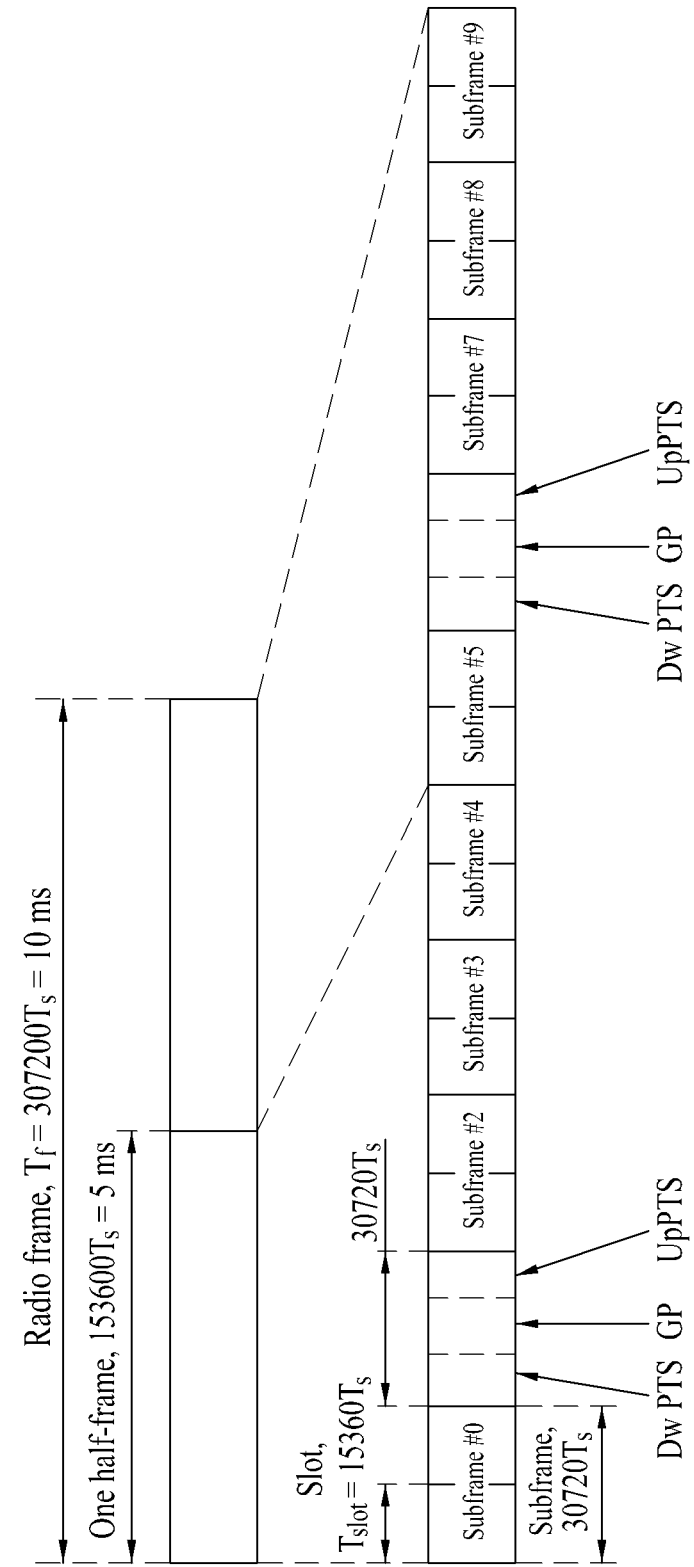
FIG. 1 illustrates the structure of a radio frame.

FIG. 1 illustrates the structure of a radio frame.

Referring to FIG. 1, a radio frame used in 3GPP LTE(-A) is 10 ms ($307200T_s$) in duration and includes 10 subframes of equal size. Subframe numbers may be assigned to the 10 subframes within one radio frame, respectively. Here, $T_s$ denotes sampling time where $T_s=1/(2048*15 \text{ kHz})$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In frequency division duplex (FDD) mode, since downlink (DL) transmission and uplink (UL) transmission are discriminated according to frequency, a radio frame for a specific frequency band includes either DL subframes or UL subframes. In TDD mode, since DL transmission and UL transmission are discriminated according to time, a radio frame for a specific frequency band includes both DL subframes and UL subframes.

Particularly, FIG. 1 illustrates the structure of a radio frame for TDD, used in 3GPP LTE(-A). Table 1 shows exemplary UL-DL configurations (UD-cfg) of subframes within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes a downlink pilot time slot (DwPTS), a guard period (GP), and an uplink pilot time slot (UpPTS). DwPTS is a time slot reserved for DL transmission and UpPTS is a time slot reserved for UL transmission. Table 2 shows an exemplary configuration of the special subframe.

Figure 2:
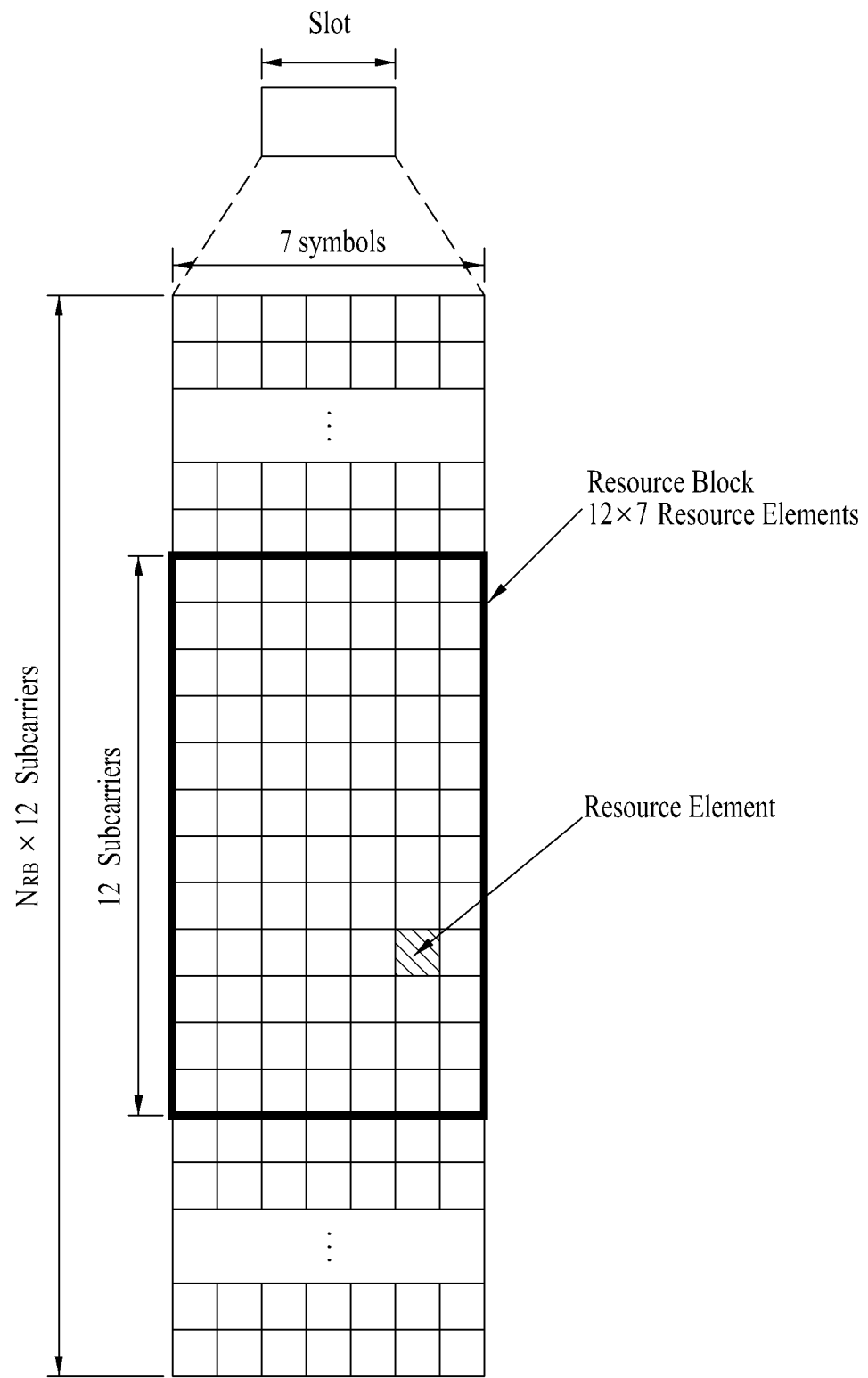
FIG. 2 illustrates a resource grid in a downlink (DL) slot.

FIG. 2 illustrates a resource grid in a DL slot.

Referring to FIG. 2, a DL slot includes a plurality OFDM symbols in the time domain. One DL slot may include 7 (or 6) OFDM symbols and one resource block (RB) may include 12 subcarriers in the frequency domain. Each element on the resource grid is referred to as a resource element (RE). One RB includes 12×7 (or 6) REs. The number $N_{RB}$ of RBs included in the DL slot depends on a DL transmit bandwidth. The structure of a UL slot is the same as that of the DL slot except that OFDM symbols are replaced with SC-FDMA symbols.

Figure 3:
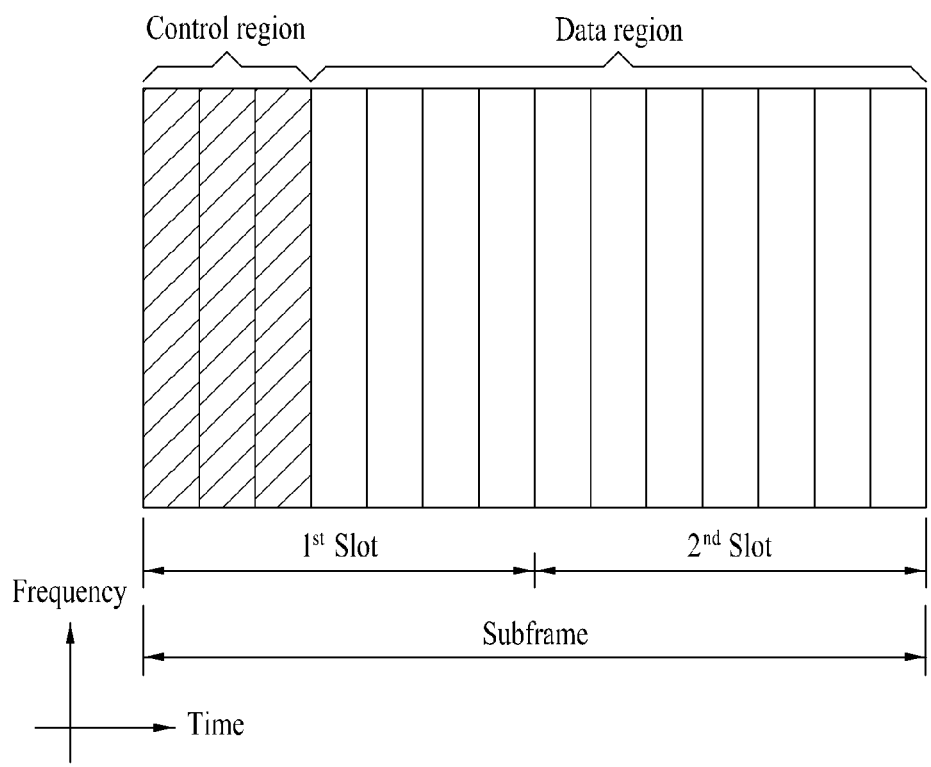
FIG. 3 illustrates the structure of a DL subframe.

FIG. 3 illustrates the structure of a DL subframe.

Referring to FIG. 3, a maximum of 3 (or 4) OFDM symbols located in a front part of a first slot of a subframe corresponds to a control region to which a control channel is allocated. OFDM symbols other than the OFDM symbols used in the control region correspond to a data region to which a physical downlink shared channel (PDSCH) is allocated. The PDSCH is used to carry a transport block (TB) or a codeword (CW) corresponding to the TB. The TB refers to a data block transmitted from a medium access control (MAC) layer to a physical (PHY) layer through a transmission channel. The CW corresponds to a coded version of the TB. A mapping relationship between the TB and the CW may depend upon swapping. In this specification, PDSCH, TB, and CW are used interchangeably. Examples of DL control channels used in LTE(-A) include a physical control format indicator channel (PCFICH), a physical downlink control channel (PDCCH), a physical hybrid ARQ indicator channel (PHICH), etc. The PCFICH is transmitted on the first OFDM symbol of a subframe and carries information about the number of OFDM symbols available for transmission of control channels within the subframe. The PHICH carries a hybrid automatic repeat request (HARQ)-acknowledgment (ACK) signal as a response to UL transmission. A HARQ-ACK response includes positive ACK (simply, ACK), negative ACK (NACK), discontinuous transmission (DTX), or NACK/DTX. Here, HARQ-ACK is used interchangeably with HARQ ACK/NACK and ACK/NACK.

Control information transmitted through the PDCCH is referred to as downlink control information (DCI). The DCI includes resource allocation information for a user equip-

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — | ment (UE) or UE group and other control information. For example, the DCI includes UL/DL scheduling information, a UL transmit (Tx) power control command, etc. Information content of transmission modes and DCI formats for configuring a multi-antenna technology are as follows.

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Transmission using UE-specific reference signals DCI Format
Format 0: Resource grants for physical uplink shared channel (PUSCH) transmissions (uplink)
Format 1: Resource assignments for single codeword PDSCH transmissions (transmission modes 1, 2 and 7)
Format 1A: Compact signaling of resource assignments for single codeword PDSCH (all modes)
Format 1B: Compact resource assignments for PDSCH using rank-1 closed loop precoding (mode 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments As described above, the PDCCH may carry transport format and resource allocation information of a downlink shared channel (DL-SCH), transport format and resource allocation information of an uplink shared channel (UL-SCH), paging information on a paging channel (PCH), system information on the DL-SCH, resource allocation information of a higher-layer control message such as a random access response transmitted on a PDSCH, a set of Tx power control commands for individual UEs within a UE group, a Tx power control command, information indicating activation of voice over IP (VoIP), etc. A plurality of PDCCHs may be transmitted within a control region. A UE may monitor a plurality of PDCCHs. The PDCCH is transmitted on an aggregation of one or multiple consecutive control channel elements (CCEs). The CCE is a logical allocation unit used to provide a coding rate for the PDCCH based on a radio channel state. The CCE corresponds to a plurality of resource element groups (REGs). A format for the PDCCH and the number of bits of the PDCCH are determined by the number of CCEs. A base station (BS) determines a PDCCH format according to DCI to be transmitted to the UE and attaches a cyclic redundancy check (CRC) to control information. The CRC is masked with a unique identifier (e.g. a radio network temporary identifier (RNTI)) according to an owner or usage of the PDCCH. For example, if the PDCCH is for a specific UE, an identifier (e.g. cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 4:
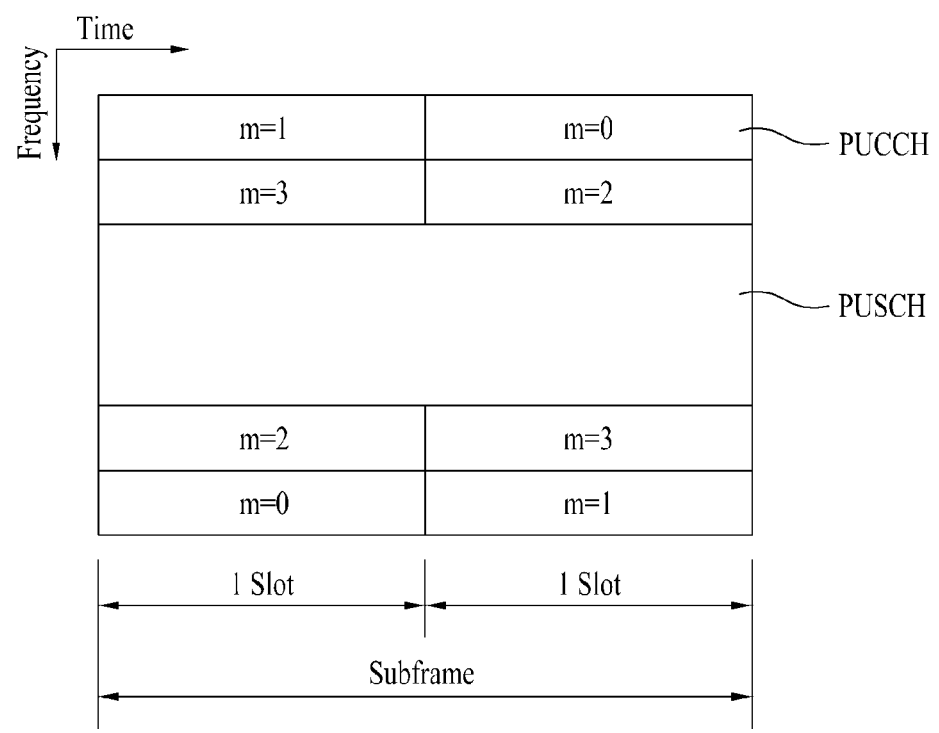
FIG. 4 illustrates the structure of an uplink (UL) subframe.

FIG. 4 illustrates the structure of a UL subframe used in LTE.

Referring to FIG. 4, a UL subframe includes a plurality of (e.g. 2) slots. A slot may include a different number of SC-1-DMA symbols according to a CP length. The UL subframe is divided into a data region and a control region in the frequency domain. The data region comprises a PUSCH and is used to carry a data signal such as audio data. The control region comprises a PUCCH and is used to carry uplink control information (UCI). The PUCCH includes an RB pair located at both ends of the data region in the frequency domain and hops in a slot boundary.

The PUCCH may be used to transmit the following control information.

Scheduling request (SR): This information is used to request a UL-SCH resource and is transmitted using an on-off keying (OOK) scheme.

HARQ-ACK: This is a response to a DL data packet (e.g. codeword) on a PDSCH and indicates whether the DL data packet has been successfully received. 1-bit HARQ-ACK is transmitted as a response to a single DL codeword and a 2-bit HARQ-ACK is transmitted as a response to two DL codewords. A HARQ-ACK response includes a positive ACK (simply, ACK), negative ACK (NACK), DTX, or NACK/DRX. The term HARQ-ACK is used interchangeably with HARQ ACK/NACK and ACK/NACK.

Channel state information (CSI): This is feedback information about a downlink channel. Multiple input multiple output (MIMO)-related feedback information includes a rank indicator (RI) and a precoding matrix indicator (PMI). 20 bits are used per subframe.

The quantity of control information (UCI) that a UE may transmit in a subframe depends on the number of SC-FDMA symbols available for control information transmission. SC-1-DMA symbols available for control information transmission means SC-1-DMA symbols other than SC-FDMA symbols used for transmitting reference signals in a subframe. In the case of a subframe in which a sounding reference signal (SRS) is configured, the last SC-FDMA symbol of the subframe is excluded from the SC-FDMA symbols available for control information transmission. A reference signal is used for coherent detection of a PUCCH. The PUCCH supports various formats according to information transmitted thereon.

Table 3 shows the mapping relationship between PUCCH formats and UCI in LTE(-A),

TABLE 3

| PUCCH format | Uplink control information (UCI) |
| --- | --- |
| Format 1 | Scheduling request (SR) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CSI (20 coded bits) |
| Format 2 | CSI and 1-bit or 2-bit HARQ ACK/NACK (20 bits) (only in case of extended CP) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | Up to 24-bit HARQ ACK/NACK + SR |

A description will be given of TDD signal transmission timing in a single carrier (or cell) situation with reference to FIGS. 5 to 11.

Figure 5:
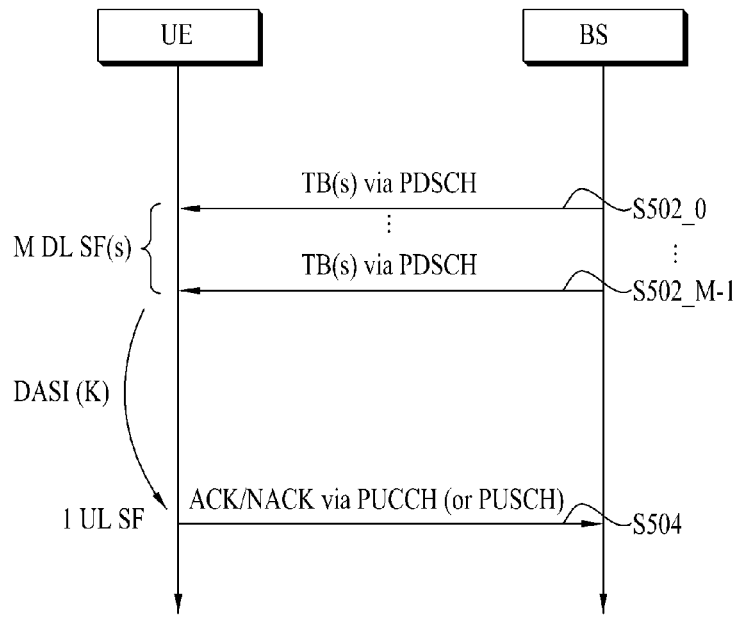
FIGS. 5 and 6 illustrate TDD UL acknowledgement/negative acknowledgement (ACK/NACK) transmission timing in a single cell situation.
Figure 6:
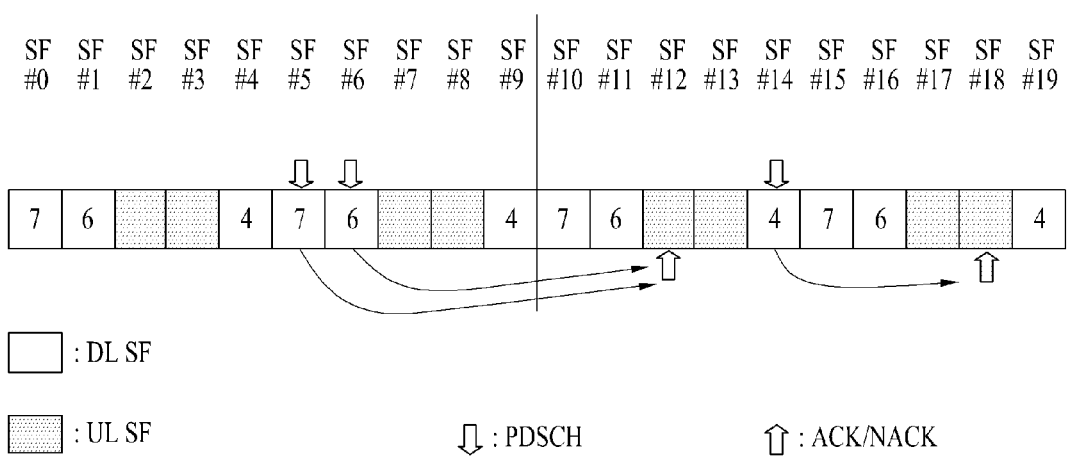

FIGS. 5 and 6 illustrate PDSCH-UL ACK/NACK timing. Here, UL ACK/NACK means ACK/NACK transmitted on UL, as a response to DL data (e.g. PDSCH).

Referring to FIG. 5, a UE may receive one or more PDSCH signals in M DL subframes (SFs) (S502_0 to S502_M−1). Each PDSCH signal is used to transmit one or more (e.g. 2) transport blocks (TB s) according to transmission mode. A PDCCH signal indicating release of semi-persistent scheduling (SPS) may also be received in steps S502_0 to S502_M−1, which is not shown. When a PDSCH signal and/or an SPS release PDCCH signal are present in the M DL subframes, the UE transmits ACK/NACK in one UL subframe corresponding to the M DL subframes through a procedure for transmitting ACK/NACK (e.g. ACK/NACK (payload) generation, ACK/NACK resource allocation, etc.) (S504). ACK/NACK includes ACK information about the PDSCH signal and/or SPS release PDCCH received in step S502_0 to S502_M−1. While ACK/NACK is transmitted through a PUCCH basically, ACK/NACK is transmitted through a PUSCH when the PUSCH is transmitted at ACK/NACK transmission timing. Various PUCCH formats shown in Table 3 may be used for ACK/NACK transmission. To reduce the number of ACK/NACK bits transmitted through a PUCCH format, various methods such as ACK/NACK bundling and ACK/NACK channel selection may be used.

As described above, in TDD, ACK/NACK for data received in the M DL subframes is transmitted through one UL subframe (i.e. M DL SF(s): 1 UL SF) and the relationship therebetween is determined by a downlink association set Index (DASI).

Table 4 shows DASI (K: $\{k_0, k_1, \ldots, k_{M-1}\}$) defined in LTE(-A). Table 4 shows intervals between a UL subframe transmitting ACK/NACK and a DL subframe associated with the UL subframe from the perspective of the UL subframe. Specifically, when a PDCCH that indicates PDSCH transmission and/or SPS release is present in a subframe n-k (where k∈K), the UE transmits ACK/NACK in a subframe n.

occupies a plurality of PUCCH resources for ACK/NACK transmission. ACK/NACK responses to a plurality of data units are identified by combinations of PUCCH resources used for ACK/NACK transmission and the contents of transmitted ACK/NACK (e.g. a bit value and a QPSK symbol value). Channel selection is also referred to as ACK/NACK selection or PUCCH selection.

FIG. 6 illustrates UL ACK/NACK transmission timing when UL-DL configuration #1 is configured. In FIG. 6, each of SF #0 to #9 and SF #10 to #19 corresponds to a radio frame and each numeral in blocks denotes a UL subframe associated with a DL subframe from the perspective of the DL subframe. For example, ACK/NACK for a PDSCH of SF#5 is transmitted in SF #5+7 (=SF #12) and ACK/NACK for a PDSCH of SF #6 is transmitted in SF #6+6 (=SF #12). Accordingly, both ACKs/NACKs for DL signals of SF #5 and SF #6 are transmitted in SF #12. Similarly, ACK/NACK for a PDSCH of SF #14 is transmitted in SF #14+4 (=SF #18).

Figure 7:
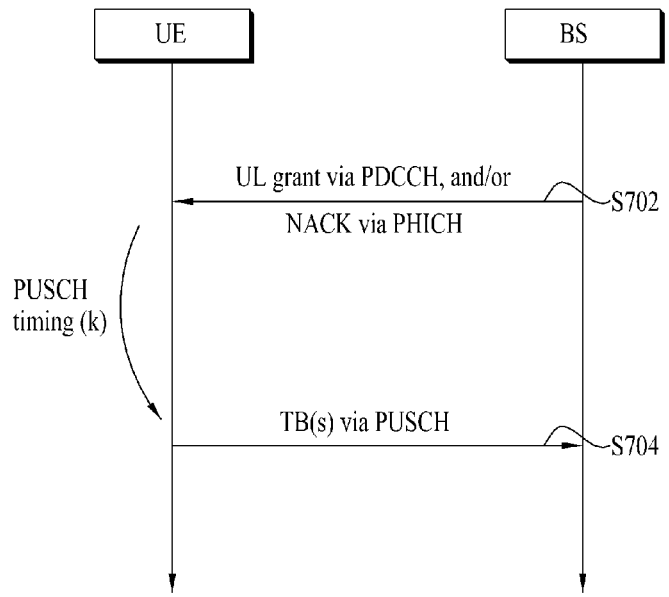
FIGS. 7 and 8 illustrate TDD physical uplink shared channel (PUSCH) transmission timing in a single cell situation.
Figure 8:
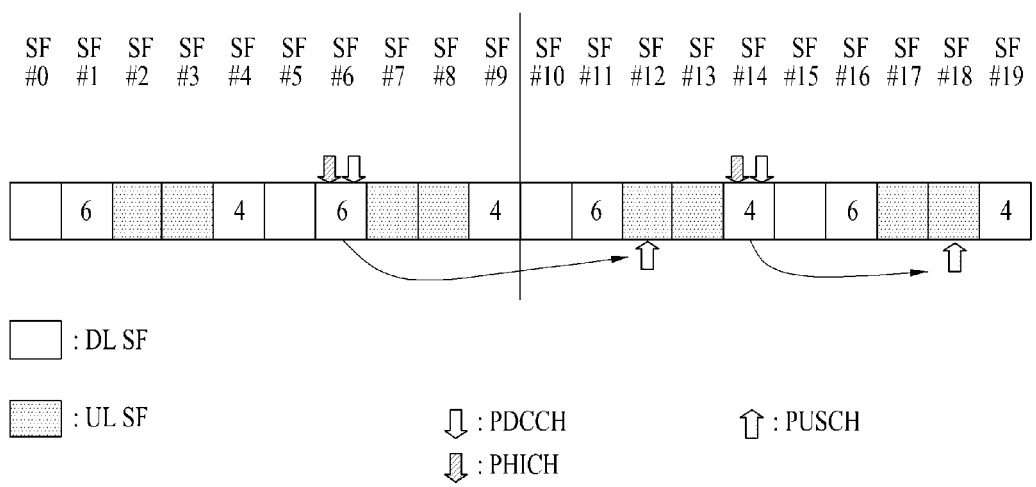

FIGS. 7 and 8 illustrate PHICH/UL grant (UG)-PUSCH timing. A PUSCH may be transmitted corresponding to a PDCCH (UL grant) and/or a PHICH (NACK).

Referring to FIG. 7, a UE may receive a PDCCH (UL grant) and/or a PHICH (NACK) (S702). Here, NACK corresponds to an ACK/NACK response to previous PUSCH transmission. In this case, the UE may initially transmit/retransmit one or more TBs through a PUSCH after k subframes through a procedure for PUSCH transmission (e.g. TB coding, TB-CW swapping, PUSCH resource allocation, etc.) (S704). This example is based on the assumption of performing a normal HARQ operation in which a PUSCH is transmitted once. In this case, a PHICH/UL grant corresponding to PUSCH transmission is present in the same subframe. However, in case of subframe bundling in which a PUSCH is transmitted multiple times through a plurality of subframes, a PHICH/UL grant corresponding to PUSCH transmission may be present in different subframes.

Table 5 shows an uplink association index (UAI) (k) for PUSCH transmission in LTE(-A). Table 5 shows intervals

TABLE 4

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 8 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

When operating in TDD, the UE transmits, through one UL SF, an ACK/NACK signals for one or more DL transmission signals (e.g. PDSCH signals) received through M DL SFs. A scheme for transmitting ACK/NACK for a plurality of DL SFs through one UL SF is as follows.

1) ACK/NACK bundling: ACK/NACK bits for a plurality of data units (e.g. PDSCH, SPS release PDCCH, etc.) are combined by logical operation (e.g. logic-AND operation). For example, a receiving end (e.g. UE) transmits an ACK signal upon successfully decoding all data units and transmits a NACK signal or no signal upon failing to decode (or detect) any one of the data units.

2) Channel selection: Upon receiving a plurality of data units (e.g. PDSCH, SPS release PDCCH, etc.), the UE between a DL subframe in which a PHICH/UL grant is detected and a UL subframe associated with the DL subframe from the perspective of the DL subframe. Specifically, when a PHICH/UL grant is detected in a subframe n, the UE may transmit a PUSCH in a subframe n+k.

TABLE 5

| TDD UL-DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |

TABLE 5-continued

| TDD UL-DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 2 | | | | | 4 | | | | 4 | |
| 3 | | 4 | | | | | | | 4 | 4 |
| 4 | | | | | | | | | 4 | 4 |
| 5 | | | | | | | | | 4 | |
| 6 | | 7 | 7 | | | | | 7 | 7 | 5 |

FIG. 8 illustrates PUSCH transmission timing when UL-DL configuration #1 is configured. In FIG. 8, each of SF #0 to #9 and SF #10 to #19 corresponds to a radio frame and each numeral in blocks denotes a UL subframe associated with a DL subframe from the perspective of the DL subframe. For example, a PUSCH corresponding to PHICH/UL grant of SF #6 is transmitted in SF #6+6 (=SF #12) and a PUSCH corresponding to a PHICH/UL grant of SF #14 is transmitted in SF #14+4 (=SF #18).

Figure 9:
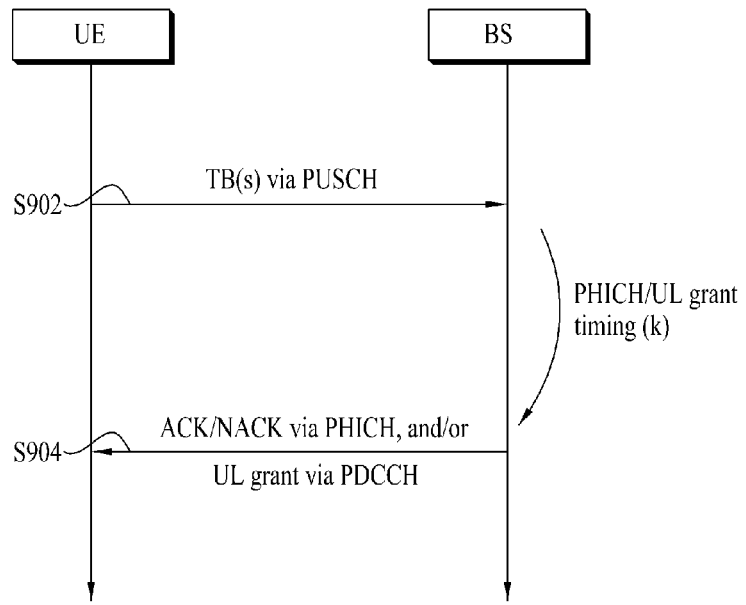
FIGS. 9 and 10 illustrate TDD DL ACK/NACK transmission timing in a single cell situation.
Figure 10:
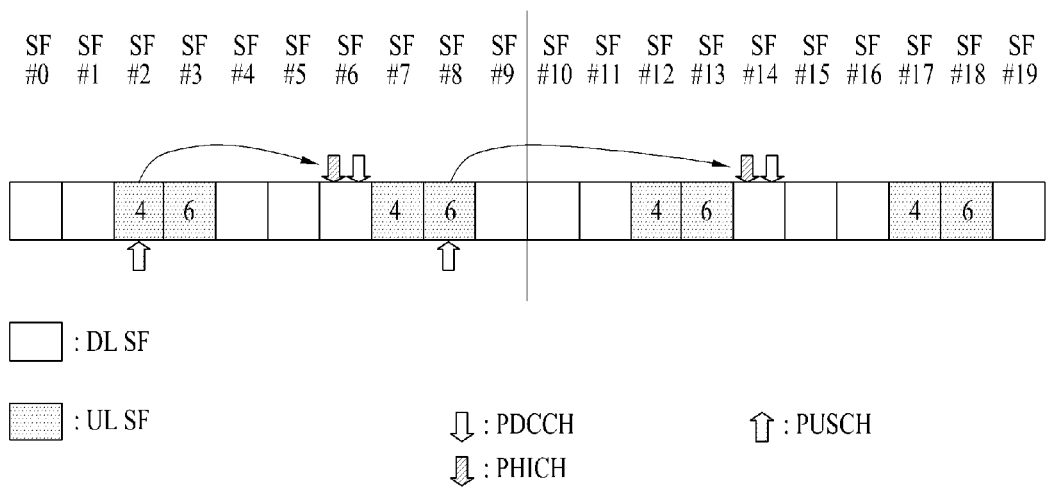

FIGS. 9 and 10 illustrate PUSCH-PHICH/UL grant timing. A PHICH is used to transmit DL ACK/NACK. Here, DL ACK/NACK means ACK/NACK transmitted on DL as a response to UL data (e.g. PUSCH).

Referring to FIG. 9, a UE transmits a PUSCH signal to a BS (S902). Here, the PUSCH signal is used to transmit one or more (e.g. 2) TBs according to transmission mode. The BS may transmit ACK/NACK as a response to PUSCH transmission via a PHICH after k subframes through a procedure for ACK/NACK transmission (e.g. ACK/NACK generation, ACK/NACK resource allocation, etc.) (S904). ACK/NACK includes ACK information about the PUSCH signal of step S902. When the response to PUSCH transmission is NACK, the BS may transmit a UL grant PDCCH for PUSCH retransmission to the UE after k subframes (S904). This example is based on the assumption of performing a normal HARQ operation in which a PUSCH is transmitted once. In this case, a PHICH/UL grant corresponding to PUSCH transmission may be transmitted in the same subframe. In the case of subframe bundling, however, the PHICH/UL grant corresponding to PUSCH transmission may be transmitted in different subframes.

Table 6 shows a UAI (k) for PHICH/UL grant transmission in LTE(-A). Table 6 shows intervals between a DL subframe in which a PHICH/UL grant is present and a UL subframe associated with the DL subframe from the perspective of the DL subframe. Specifically, a PHICH/UL grant of subframe i corresponds to PUSCH transmission of subframe i-k.

TABLE 6

| TDD UL-DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | | 4 | | 6 |
| 2 | | | | 6 | | | | | 6 | |
| 3 | 6 | | | | | | | 6 | 6 | |
| 4 | | | | | | | | 6 | 6 | |
| 5 | | | | | | | | 6 | | |
| 6 | 6 | 4 | | | | 7 | 4 | | | 6 |

FIG. 10 illustrates PHICH/UL grant transmission timing when UL-DL configuration #1 is configured. In FIG. 10, each of SF #0 to #9 and SF #10 to #19 corresponds to a radio frame and each numeral in blocks denotes a DL subframe associated with a UL subframe from the perspective of the UL subframe. For example, a PHICH/UL grant corresponding to a PUSCH of SF #2 is transmitted in SF #2+4 (=SF #6) and a PHICH/UL grant corresponding to a PUSCH of SF #8 is transmitted in SF #8+6 (=SF #14). [95] PHICH resource allocation will now be described. When a PUSCH is transmitted in subframe #n, the UE determines a PHICH resource corresponding to the PUSCH in subframe #(n+kPHICH). In FDD, kPHICH has a fixed value (e.g. 4). In TDD, kPHICH has a value depending on UL-DL configuration. Table 7 shows kPHICH for TDD, which is equivalent to Table 6.

TABLE 7

| TDD UL-DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

A PHICH resource is provided by [PHICH group index, orthogonal sequence index]. The PHICH group index and the orthogonal sequence index are determined using (i) a lowest PRB index used for PUSCH transmission and (ii) a 3-bit field value for demodulation reference signal (DMRS) cyclic shift. Here, (i) and (ii) are indicated by a UL grant PDCCH.

A description will be given of a HARQ process. The UE executes a plurality of parallel HARQ processes for UL transmission. The parallel HARQ processes enable continuous UL transmission while the UE waits for HARQ feedback representing whether previous UL transmission has been successful or not. Each HARQ process is associated with a HARQ buffer of a MAC layer. Each HARQ process manages the number of transmissions of a MAC physical data unit (PDU) in the buffer, HARQ feedback for the MAC PDU in the buffer, and a state parameter regarding a current redundancy version.

In the case of LTE(-A) FDD, the number of UL HARQ processes for non-subframe bundling operation (i.e. normal HARQ operation) is 8. In case of LTE(-A) TDD, the number of UL HARQ processes and HARQ round trip time (RTT) are configured differently according to DL-UL configurations because the number of UL subframes depends on UL-DL configuration. Here, the HARQ RTT may be a time interval (e.g. in the unit of SF or ms) between a time when a UL grant is received and a time when a PHICH (corresponding to the UL grant) is received through transmission of a PUSCH (corresponding to the UL grant) or a time interval between a PUSCH transmission time and a PUSCH retransmission time. When subframe bundling is applied, a bundle of PUSCH transmission configured in 4 contiguous UL subframes is performed in FDD and TDD. Accordingly, a HARQ operation/process when subframe bundling is applied is different from the normal HARQ operation/process.

Table 8 shows the maximum number of DL HARQ processes according to UL-DL configuration in TDD.

TABLE 8

| TDD UL/DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

Table 9 shows the number of synchronous UL HARQ processes and HARQ RTT in TDD. When the UL HARQ RTT is 10 [SFs or ms] (UL-DL configurations #1, #2, #3, #4 and #5), one UL HARQ process uses one fixed UL SF timing. However, when the UL HARQ RTT is not 10 [SFs or ms] (UL-DL configurations #0 and #6), one UL HARQ process uses a plurality of UL SF timings (instead of one fixed UL SF timing) (while hopping). For example, in the case of UL-DL configuration #6, PUSCH transmission timings in one UL HARQ process may be: SF #2: PUSCH=>SF #13: PUSCH (RTT: 11 SFs)=>SF #24: PUSCH (RTT: 11 SFs)=>SF #37: PUSCH (RTT: 13 SFs)=>SF #48: PUSCH (RTT: 11 SFs)=>SF #52: PUSCH (RTT: 14 SFs).

TABLE 9

| UL-DL configuration | Number of UL SFs | Number of HARQ processes for normal HARQ operation | HARQ RTT |
|---|---|---|---|
| 0 | 6 | 7 | 11 or 13 |
| 1 | 4 | 4 | 10 |
| 2 | 2 | 2 | 10 |
| 3 | 3 | 3 | 10 |
| 4 | 2 | 2 | 10 |
| 5 | 1 | 1 | 10 |
| 6 | 5 | 6 | 11 or 13 or 14 |

In the case of TDD UL-DL configurations #1 to #6 and normal HARQ operation, upon detecting a UL grant PDCCH and/or a PHICH in subframe n, the UE transmits a corresponding PUSCH signal in subframe n+k (refer to Table 5) according to information about the PDCCH and/or the PHICH.

In the case of TDD UL-DL configuration #0 and the normal HARQ operation, when the UE detects a UL DCI grant PDCCH and/or a PHICH in subframe n, PUSCH transmission timing of the UE varies according to conditions. First, when the most significant bit (MSB) of a UL index in DCI is 1 or the PHICH is received through a resource corresponding to IPHICH=0 in subframe #0 or #5, the UE transmits a corresponding PUSCH signal in subframe n+k (refer to Table 5). Next, when the least significant bit (LSB) of the UL index in the DCI is 1, the PHICH is received through a resource corresponding to IPHICH=1 in subframe #0 or #5, or the PHICH is received in subframe #1 or #6, the UE transmits the corresponding PUSCH signal in subframe #n+7. When both the MSB and LSB in the DCI are set, the UE transmits the corresponding PUSCH signal in subframe #n+k (refer to Table 5) and subframe #n+7.

A HARQ process is associated with a soft buffer for a TB and a soft buffer for a code block in a PHY layer. During channel coding, a TB may be divided into one or more code blocks in consideration of the size of a channel encoder. After channel coding, the one or more code blocks are combined to configure a codeword corresponding to the TB.

The HARQ process is in charge of reliable transmission of a TB and the TB may be divided into one or more code blocks in consideration of the size of an encoder. In LTE(-A), a code block is coded according to ⅓ turbo coding and the coded code block includes one system sub-block and two parity sub-blocks. Each sub-block is permuted through a sub-block interleaver matrix having a size of $K_\pi$. A circular buffer of length $K_w=3K_\pi$ for an r-th coded block in a transmitter is generated as follows.

$$w_k = v_k^{(0)} \text{ for } k=0, \ldots, k_\pi-1$$

$$w_{k_\pi+2k} = v_k^{(1)} \text{ for } k=0, \ldots, k_\pi-1$$

$$w_{k_\pi+2k+1} = v_k^{(2)} \text{ for } k=0, \ldots, k_\pi-1 \quad \text{[Equation 1]}$$

$N_{IR}$ bits denote a soft buffer size of a TB and $N_{cb}$ denotes a soft buffer size of the r-th code block. $N_{cb}$ is obtained as follows, where C is the number of code blocks.

$$N_{cb} = \min\left(\left\lfloor \frac{N_{IR}}{C} \right\rfloor, K_w\right) \text{ for } DL\text{-} \quad \text{[Equation 2]}$$

$SCH$ and $PCH$ transport channels $N_{CB} = K_w$ for $UL\text{-}SCH$ and $MCH$ transport channels where $N_{IR}$ is equal to:

$$N_{IR} = \left\lfloor \frac{N_{soft}}{K_C \cdot K_{MIMO} \cdot \min(M_{DL\_HARQ}, M_{limit})} \right\rfloor \quad \text{[Equation 3]}$$

where $N_{soft}$ is the total number of soft channel bits according to UE capability.

If $N_{soft}$=35982720, $K_C$=5,
else if $N_{soft}$=3654144 and the UE is capable of supporting a maximum of two spatial layers for a DL cell, $K_C$=2
else $K_C$=1
End if.

$K_{MIMO}$ is equal to 2 if the UE is configured to received PDSCH transmission based on transmission mode 3, 4, 8, or 9 and is equal to 1 other wise.

$M_{DL\_HARQ}$ is the maximum number of DL HARQ processes.

$M_{limit}$ is equal to 8.

In FDD and TDD, if the UE is configured with more than two serving cells and fails to decode a code block of a TB with respect to at least $K_{MIMO} \cdot \min(M_{DL\_HARQ}, M_{limit})$ TBs for each serving cell, the UE stores soft channel bits received in the range of at least $w_k, w_{k+1}, \ldots, w_{mod(k+n_{SB}-1, N_{cb})}$ where $n_{SB}$ is given by Equation 4.

$$n_{SB} = \min\left(N_{cb}, \left\lfloor \frac{N'_{soft}}{C \cdot N_{cells}^{DL} \cdot K_{MIMO} \cdot \min(M_{DL\_HARQ}, M_{limit})} \right\rfloor\right) \quad \text{[Equation 4]}$$

$w_k$, C, $N_{cb}$, $K_{MIMO}$, and $M_{limit}$ are as defined above.

$M_{DL\_HARQ}$ is the maximum number of DL HARQ processes.

$N_{cells}^{DL}$ is the number of configured serving cells.

$N'_{soft}$ is the total number of soft channel bits according to UE capability.

Upon determining k, the UE gives priority to storing soft channel bits corresponding to k of lower values first. $w_k$ corresponds to a received soft channel bit. The range $w_k$ $w_{k+1}, \ldots, w_{k+1}, \ldots, w_{mod(k+n_{SB}-1,N_{cb})}$ may include subsets which do not contain received soft channel bits.

Figure 11:
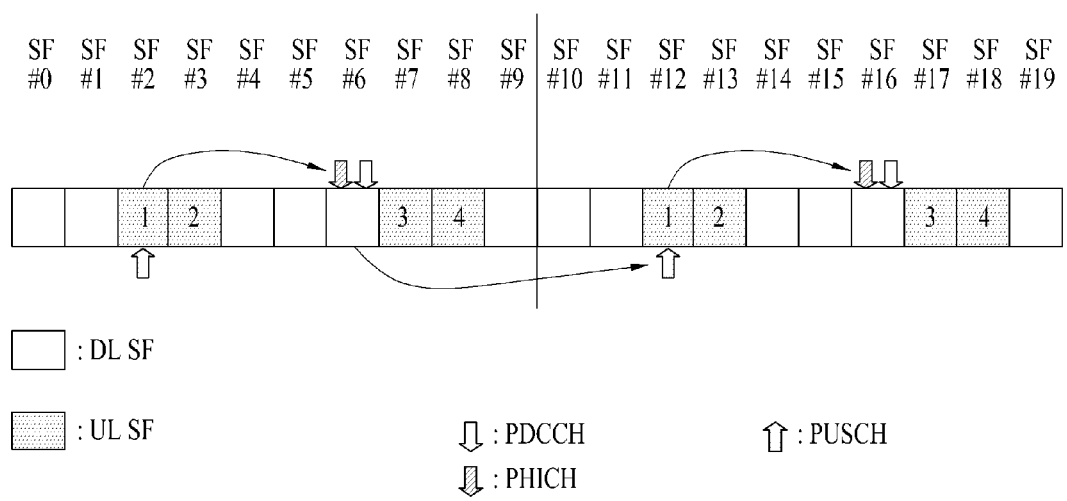
FIG. 11 illustrates a TDD hybrid automatic repeat request (HARQ) process in a single cell situation.

FIG. 11 illustrates a synchronous UL HARQ process when UL-DL configuration #1 is configured. Each numeral in blocks denotes a UL HARQ process number. This example represents a normal UL HARQ process. Referring to FIG. 11, HARQ process #1 involves SF #2, SF #6, SF #12 and SF #16. For example, if an initial PUSCH signal (e.g. RV=0) is transmitted in SF #2, a UL grant PDCCH and/or a PHICH corresponding to the PUSCH signal may be received in SF #6 and a (retransmission) PUSCH signal (e.g. RV=2) corresponding to the initial PUSCH signal may be transmitted in SF #12. Accordingly, 4 UL HARQ processes having an RTT (Round Trip Time) of 10 SFs (or 10 ms) are present in the case of UL-DL configuration #1.

Figure 12:
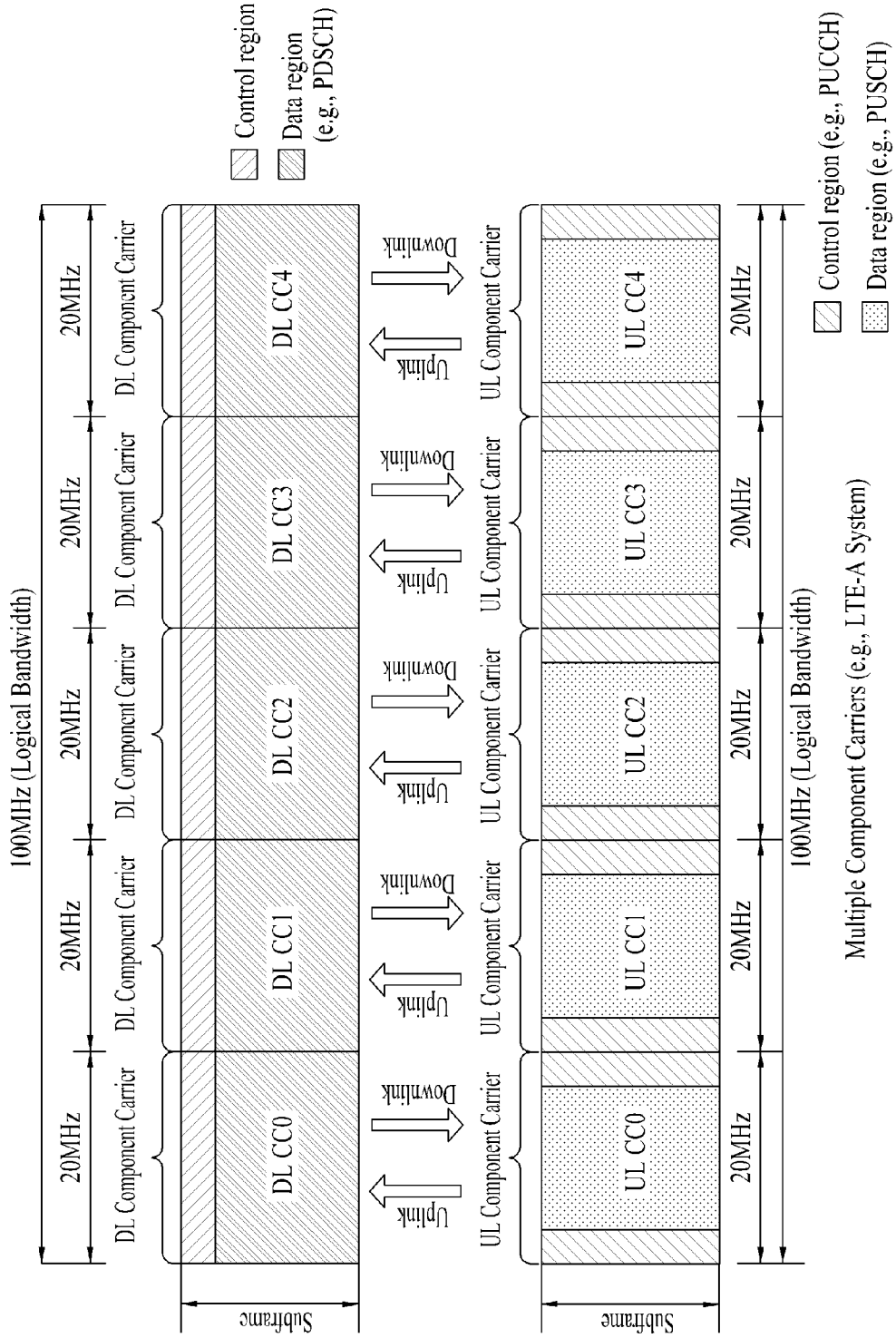
FIG. 12 illustrates a carrier aggregation (CA) communication system.

FIG. 12 illustrates a communication system for carrier aggregation (CA). An LTE-A system employs CA (or bandwidth aggregation) technology which aggregates a plurality of UL/DL frequency blocks to obtain a wider UL/DL frequency bandwidth. Each frequency block is transmitted using a component carrier (CC). The CC may be construed as a carrier frequency (or center carrier, center frequency) for the corresponding frequency block.

Referring to FIG. 12, a plurality of UL/DL CCs may be aggregated to support a wider UL/DL bandwidth. The CCs may be contiguous or non-contiguous in the frequency domain. A bandwidth of each component carrier may be independently determined. Asymmetrical CA is possible, in which the number of UL CCs is different from the number of DL CCs. For example, when there are two DL CCs and one UL CC, the DL CCs and UL CC may be configured to be in 2:1 correspondence. A DL CC/UL CC link may be fixed or semi-statically configured in the system. Even if the entire system bandwidth is configured with N CCs, a frequency band that a specific UE can monitor/receive may be limited to M (<N) CCs. Various parameters for CA may be configured cell-specifically, UE-group-specifically, or UE-specifically. Control information may be transmitted/received only via a specific CC. This specific CC may be referred to as a primary CC (PCC) and the other CCs may be referred to as secondary CCs (SCCs).

In LTE-A, the concept of a cell is used to manage radio resources. A cell is defined as a combination of a DL resource and a UL resource and the UL resource is not mandatory. Accordingly, a cell may be composed of the DL resource only or both the DL resource and the UL resource. If CA is supported, the linkage between a carrier frequency of the DL resource (or DL CC) and a carrier frequency of the UL resource (or UL CC) may be indicated by system information. A cell operating in a primary frequency (or PCC) may be referred to as a primary cell (PCell) and a cell operating in a secondary frequency (or a SCC) may be referred to as a secondary cell (SCell). The PCell is used for a UE to perform a procedure for initial connection establishment or a procedure for connection re-establishment. The PCell may refer to a cell operating on a DL CC SIB2-linked to a UL CC on which a control signal is transmitted. In addition, the PCell may refer to a cell indicated during handover. The SCell may be configured after RRC connection establishment and may be used to provide additional radio resources. The PCell and the SCell may collectively be referred to as a serving cell. Accordingly, a single serving cell composed of a PCell only is present for a UE in an RRC_Connected state, for which CA is not configured or which does not support CA. On the other hand, one or more serving cells including a PCell and entire SCells are present for a UE in an RRC_CONNECTED state, for which carrier aggregation is configured. For CA, a network may configure one or more SCells in addition to an initially configured PCell, for a UE supporting CA during a procedure for connection establishment after a procedure for initial security activation is initiated.

FIG. 13 illustrates scheduling when a plurality of carriers is aggregated. It is assumed that 3 DL CCs are aggregated and DL CC A is set to a PDCCH CC. Each of DL CC A, DL CC B, and DL CC C may be referred to as a serving CC, serving carrier, serving cell, etc. If a carrier indicator field (CIF) is disabled, each DL CC may transmit only a PDCCH that schedules a PDSCH of the DL CC without a CIF according to an LTE PDCCH rule (non-cross-CC scheduling). When the CIF is enabled by UE-specific (or UE-group-specific or cell-specific) higher layer signaling, a specific CC (e.g. DL CC A) may carry not only a PDCCH that schedules the PDSCH of the DL CC A but also PDCCHs that schedule PDSCHs of other DL CCs using the CIF (cross-CC scheduling). Meanwhile, a PDCCH is not transmitted in DL CC B/C.

A specific CC (or cell) used to transmit a PDCCH is called a scheduling CC (or scheduling cell). The term scheduling CC (or cell) may be used interchangeably with the term monitoring CC (or MCC). A CC (or cell) in which a PDSCH/PUSCH is scheduled by a PDCCH of another CC is called a scheduled CC (or scheduled cell). One or more scheduling CCs may be configured for one UE. One or more scheduling CCs may be configured for one UE and one of the scheduling CCs may be configured to be in charge of DL control signaling and UL PUCCH transmission. That is, a scheduling CC includes a PCC. When only one scheduling CC is configured, the scheduling CC is equivalent to the PCC. For convenience, the scheduling CC/scheduled CC may be referred to as MCC/SCC in the following description.

Currently, in the case in which cross-CC scheduling is configured, CCs carrying signals are defined according to signal type as follows.

PDCCH (UL/DL grant): scheduling CC (or MCC)
PDSCH/PUSCH: CC indicated by a CIF of a PDCCH detected from a scheduling CC
DL ACK/NACK (e.g. PHICH): scheduling CC (or MCC) (e.g. DL PCC)
UL ACK/NACK (e.g. PUCCH): UL PCC FIG. 14 is a view for explaining a method for transmitting ACK/NACK information using channel selection in a legacy CA TDD system.

Referring to FIG. 14, it is assumed that two serving cells (i.e. PCell and SCell) (or PCC and SCC) having the same TDD UL-DL Cfg are aggregated in the conventional CA TDD system. A channel selection scheme using PUCCH format 1b when M≤2 in UL subframe n for HARQ-ACK transmission will first be described. Here, M denotes the number of elements in set K (i.e. the number of DL SFs corresponding to UL SFs) described above with reference to Table 4. When M≤2 in UL subframe n, a UE may transmit b(0)b(1) on a PUCCH resource selected from A PUCCH resources $n^{(1)}_{PUCCH,i}$ (where 0≤i≤A−1 and A ⊂ {2, 3, 4}). Specifically, the UE transmits an A/N signal in UL subframe n using PUCCH format 1b according to Table 10, 11, and 12. When M=1 in UL subframe n, HARQ-ACK(j) denotes an A/N response to a TB or an SPS release PDCCH, which is related to serving cell c. When M=1, a TB, HARQ-ACK(j), and A PUCCH resources may be given by Table 13. When M=2 in UL subframe n, HARQ-ACK(j) denotes an A/N response to a TB or an SPS release PDCCH in DL subframe (s) provided by set K in each serving cell. Here, when M=2, subframes and A PUCCH resources in each serving cell for HARQ-ACK(j) may be given according to Table 14.

Table 10 is a mapping table for channel selection defined in an LTE-A system, when two CCs having the same UL-DL Cfg are aggregated and when M=1 and A=2.

TABLE 10

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | | No Transmission |

Here, an implicit PUCCH resource linked to a PDCCH that schedules a PCC (or PCell) (i.e. PCC-PDCCH) may be allocated to $n_{PUCCH,0}^{(1)}$ and an implicit PUCCH resource linked to a PDCCH that schedules an SCC (i.e. SCC-PDCCH) or an explicit PUCCH resource reserved through RRC may be allocated to $n_{PUCCH,1}^{(1)}$ according to whether cross-CC scheduling is performed. For example, in a cross-CC scheduling situation, an implicit PUCCH resource linked to the PCC-PDCCH may be allocated to $n_{PUCCH,0}^{(1)}$ and an implicit PUCCH resource linked to the SCC-PDCCH may be allocated to $n_{PUCCH,1}^{(1)}$.

Table 11 is a mapping table for channel selection defined in an LTE-A system, when two CCs having the same UL-DL Cfg are aggregated and when M=1 and A=3.

TABLE 11

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | | No Transmission |

Here, when a PCC is a MIMO CC and an SCC is a non-MIMO CC, implicit PUCCH resources linked to PCC-PDCCHs may be allocated to $n_{PUCCH,0}^{(1)}$ and $n_{PUCCH,1}^{(1)}$ and an implicit PUCCH resource linked to an SCC-PDCCH or an explicit PUCCH resource reserved by RRC may be allocated to $n_{PUCCH,2}^{(1)}$ according to whether cross-CC scheduling is performed. If the PCC is a non-MIMO CC and the SCC is a MIMO CC, an implicit PUCCH resource linked to a PCC-PDCCH may be allocated to $n_{PUCCH,0}^{(1)}$ and implicit PUCCH resources linked to SCC-PDCCHs or explicit PUCCH resources reserved by RRC may be allocated to $n_{PUCCH,1}^{(1)}$ and $n_{PUCCH,2}^{(1)}$ according to whether cross-CC scheduling is performed.

Table 12 is a mapping table for channel selection defined in an LTE-A system, when two CCs having the same UL-DL Cfg are aggregated and when M≥2 and A=4.

TABLE 12

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | | No Transmission |

Here, implicit PUCCH resources linked to PDCCHs that schedule a PCC (or PCell) (i.e. PCC-PDCCHs) may be allocated to $n_{PUCCH,0}^{(1)}$ and/or $n_{PUCCH,1}^{(1)}$ irrespective of whether cross-CC scheduling is applied and implicit PUCCH resources linked to PDCCHs that schedule an SCC (i.e. SCC-PDCCHs) or explicit PUCCH resources reserved by RRC may be allocated to $n_{PUCCH,2}^{(1)}$ and/or $n_{PUCCH,3}^{(1)}$ according to whether cross-CC scheduling is applied. For example, when M=2 in a cross-CC scheduling situation, implicit PUCCH resources linked to the PCC-PDCCHs of first and second DL SFs may be allocated to $n_{PUCCH,0}^{(1)}$ and $n_{PUCCH,1}^{(1)}$, respectively and implicit PUCCH resources linked to the SCC-PUCCHs of the first and second DL SFs may be allocated to $n_{PUCCH,2}^{(1)}$ and $n_{PUCCH,3}^{(1)}$, respectively.

Table 13 shows TBs, HARQ-ACK(j), and PUCCH resources when M=1.

TABLE 13

| | HARQ-ACK(j) | | | |
|---|---|---|---|---|
| A | HARQ-ACK(0) | HARQ-ACK(1) | HARQ-ACK(2) | HARQ-ACK(3) |
| 2 | TB1 Primary cell | TB1 Secondary cell | NA | NA |
| 3 | TB1 Primary cell | TB1 Secondary cell | TB2 Secondary cell | NA |
| 3 | TB1 Primary cell | TB2 Primary cell | TB1 Secondary cell | NA |
| 4 | TB1 Primary cell | TB2 Primary cell | TB1 Secondary cell | TB2 Secondary cell |

\* TB: transport block),
NA: not available

Table 13 shows TBs, HARQ-ACK(j), and PUCCH resources when M=2.

| | HARQ-ACK(j) | | | |
|---|---|---|---|---|
| A | HARQ-ACK(0) | HARQ-ACK(1) | HARQ-ACK(2) | HARQ-ACK(3) |
| 4 | The first subframe of Primary cell | The second subframe of Primary cell | The first subframe of Secondary cell | The second subframe of Secondary cell |

A channel selection scheme using PUCCH format 1b when M>2 in UL subframe n for HARQ-ACK transmission will now be described. Channel selection in this case is equal/similar to channel selection when M≤2. Specifically, the UE transmits an A/N signal using PUCCH format 1b in UL subframe n according to Tables 15 and 16. When M>2 in UL subframe, $n_{PUCCH,0}^{(1)}$ and $n_{PUCCH,1}^{(1)}$ are associated with DL transmission(s) (e.g. PDSCH transmission(s)) on a PCell and $n_{PUCCH,2}^{(1)}$ and $n_{PUCCH,3}^{(1)}$ are associated DL transmission(s) (e.g. PDSCH transmission(s)) on an SCell.

In addition, HARQ-ACK(i) for an arbitrary cell may represent an A/N response to a PDCCH (PDSCH corresponding to the PDCCH) that schedules the cell, wherein downlink assignment index (DAI)-counter (c) of the PDCCH is i+1. Meanwhile, when a PDSCH without a PDCCH is present, HARQ-ACK(0) may mean an A/N response to the PDSCH without the PDCCH and HARQ-ACK(i) may mean an A/N response to a PDCCH (PDSCH corresponding to the PDCCH), DAI-c of the PDCCH being i.

Table 15 is a mapping table for channel selection defined in an LTE-A system, when two CCs having the same UL-DL Cfg are aggregated and when M=3.

TABLE 15

| Primary Cell<br>HARQ-ACK(0),<br>HARQ-ACK(1),<br>HARQ-ACK(2) | Secondary Cell<br>HARQ-ACK(0),<br>HARQ-ACK(1),<br>HARQ-ACK(2) | Resource $n_{PUCCH}^{(1)}$ | Constellation b(0), b(1) | RM Code Input Bits o(0), o(1), o(2), o(3) |
|---|---|---|---|---|
| ACK, ACK, ACK | ACK, ACK, ACK | $n_{PUCCH,1}^{(1)}$ | 1, 1 | 1, 1, 1, 1 |
| ACK, ACK, NACK/DTX | ACK, ACK, ACK | $n_{PUCCH,1}^{(1)}$ | 0, 0 | 1, 0, 1, 1 |
| ACK, NACK/DTX, any | ACK, ACK, ACK | $n_{PUCCH,3}^{(1)}$ | 1, 1 | 0, 1, 1, 1 |
| NACK/DTX, any, any | ACK, ACK, ACK | $n_{PUCCH,3}^{(1)}$ | 0, 1 | 0, 0, 1, 1 |
| ACK, ACK, ACK | ACK, ACK, NACK/DTX | $n_{PUCCH,0}^{(1)}$ | 1, 0 | 1, 1, 1, 0 |
| ACK, ACK, NACK/DTX | ACK, ACK, NACK/DTX | $n_{PUCCH,3}^{(1)}$ | 1, 0 | 1, 0, 1, 0 |
| ACK, NACK/DTX, any | ACK, ACK, NACK/DTX | $n_{PUCCH,0}^{(1)}$ | 0, 1 | 0, 1, 1, 0 |
| NACK/DTX, any, any | ACK, ACK, NACK/DTX | $n_{PUCCH,3}^{(1)}$ | 0, 0 | 0, 0, 1, 0 |
| ACK, ACK, ACK | ACK, NACK/DTX, any | $n_{PUCCH,2}^{(1)}$ | 1, 1 | 1, 1, 0, 1 |
| ACK, ACK, NACK/DTX | ACK, NACK/DTX, any | $n_{PUCCH,2}^{(1)}$ | 0, 1 | 1, 0, 0, 1 |
| ACK, NACK/DTX, any | ACK, NACK/DTX, any | $n_{PUCCH,2}^{(1)}$ | 1, 0 | 0, 1, 0, 1 |
| NACK/DTX, any, any | ACK, NACK/DTX, any | $n_{PUCCH,2}^{(1)}$ | 0, 0 | 0, 0, 0, 1 |
| ACK, ACK, ACK | NACK/DTX, any, any | $n_{PUCCH,1}^{(1)}$ | 1, 0 | 1, 1, 0, 0 |
| ACK, ACK, NACK/DTX | NACK/DTX, any, any | $n_{PUCCH,1}^{(1)}$ | 0, 1 | 1, 0, 0, 0 |
| ACK, NACK/DTX, any | NACK/DTX, any, any | $n_{PUCCH,0}^{(1)}$ | 1, 1 | 0, 1, 0, 0 |
| NACK, any, any | NACK/DTX, any, any | $n_{PUCCH,0}^{(1)}$ | 0, 0 | 0, 0, 0, 0 |
| DTX, any, any | NACK/DTX, any, any | No Transmission | | 0, 0, 0, 0 |

Here, implicit PUCCH resources linked to PDCCHs that schedule a PCC (or PCell) (i.e. PCC-PDCCHs) may be allocated to $n_{PUCCH,0}^{(1)}$ and/or $n_{PUCCH,1}^{(1)}$ irrespective of whether cross CC scheduling is applied and implicit PUCCH resources linked to PDCCHs that schedule an SCC (i.e. SCC-PDCCHs) or explicit PUCCH resources reserved by RRC may be allocated to $n_{PUCCH,2}^{(1)}$ and/or $n_{PUCCH,3}^{(1)}$ according to whether cross CC scheduling is applied. For example, in TDD, implicit PUCCH resources linked to PCC-PDCCHs, DAIs-c of which are 1 and 2, may be allocated to $n_{PUCCH,0}^{(1)}$ and $n_{PUCCH,1}^{(1)}$ respectively, and implicit PUCCH resources linked to SCC-PDCCHs, DAIs-c of which are 1 and 2, may be allocated to $n_{PUCCH,2}^{(1)}$ and $n_{PUCCH,3}^{(1)}$, respectively.

Table 16 is a mapping table for channel selection defined in an LTE-A system, when two CCs having the same UL-DL Cfg are aggregated and when M=4.

TABLE 16

| Primary Cell<br>HARQ-ACK(0),<br>HARQ-ACK(1),<br>HARQ-ACK(2),<br>HARQ-ACK(3) | Secondary Cell<br>HARQ-ACK(0),<br>HARQ-ACK(1),<br>HARQ-ACK(2),<br>HARQ-ACK(3) | Resource $n_{PUCCH}^{(1)}$ | Constellation b(0), b(1) | RM Code Input Bits o(0), o(1), o(2), o(3) |
|---|---|---|---|---|
| ACK, ACK, ACK, NACK/DTX | ACK, ACK, ACK, NACK/DTX | $n_{PUCCH,1}^{(1)}$ | 1, 1 | 1, 1, 1, 1 |
| ACK, ACK, NACK/DTX, any | ACK, ACK, ACK, NACK/DTX | $n_{PUCCH,1}^{(1)}$ | 0, 0 | 1, 0, 1, 1 |
| ACK, DTX, DTX, DTX | ACK, ACK, ACK, NACK/DTX | $n_{PUCCH,3}^{(1)}$ | 1, 1 | 0, 1, 1, 1 |
| ACK, ACK, ACK, ACK | ACK, ACK, ACK, NACK/DTX | $n_{PUCCH,3}^{(1)}$ | 1, 1 | 0, 1, 1, 1 |
| NACK/DTX, any, any, any | ACK, ACK, ACK, NACK/DTX | $n_{PUCCH,3}^{(1)}$ | 0, 1 | 0, 0, 1, 1 |
| (ACK, NACK/DTX, any, any), except for (ACK, DTX, DTX, DTX) | ACK, ACK, ACK, NACK/DTX | $n_{PUCCH,3}^{(1)}$ | 0, 1 | 0, 0, 1, 1 |

TABLE 16-continued

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation b(0), b(1) | RM Code Input Bits o(0), o(1), o(2), o(3) |
|---|---|---|---|---|
| ACK, ACK, ACK, NACK/DTX | ACK, ACK, NACK/DTX, any | $n_{PUCCH,0}^{(1)}$ | 1, 0 | 1, 1, 1, 0 |
| ACK, ACK, NACK/DTX, any | ACK, ACK, NACK/DTX, any | $n_{PUCCH,3}^{(1)}$ | 1, 0 | 1, 0, 1, 0 |
| ACK, DTX, DTX, DTX | ACK, ACK, NACK/DTX, any | $n_{PUCCH,0}^{(1)}$ | 0, 1 | 0, 1, 1, 0 |
| ACK, ACK, ACK, ACK | ACK, ACK, NACK/DTX, any | $n_{PUCCH,0}^{(1)}$ | 0, 1 | 0, 1, 1, 0 |
| NACK/DTX, any, any, any | ACK, ACK, NACK/DTX, any | $n_{PUCCH,3}^{(1)}$ | 0, 0 | 0, 0, 1, 0 |
| (ACK, NACK/DTX, any, any), except for (ACK, DTX, DTX, DTX) | ACK, ACK, NACK/DTX, any | $n_{PUCCH,3}^{(1)}$ | 0, 0 | 0, 0, 1, 0 |
| ACK, ACK, ACK, NACK/DTX | ACK, DTX, DTX, DTX | $n_{PUCCH,2}^{(1)}$ | 1, 1 | 1, 1, 0, 1 |
| ACK, ACK, ACK, NACK/DTX | ACK, ACK, ACK, ACK | $n_{PUCCH,2}^{(1)}$ | 1, 1 | 1, 1, 0, 1 |
| ACK, ACK, NACK/DTX, any | ACK, DTX, DTX, DTX | $n_{PUCCH,2}^{(1)}$ | 0, 1 | 1, 0, 0, 1 |
| ACK, ACK, NACK/DTX, any | ACK, ACK, ACK, ACK | $n_{PUCCH,2}^{(1)}$ | 0, 1 | 1, 0, 0, 1 |
| ACK, DTX, DTX, DTX | ACK, DTX, DTX, DTX | $n_{PUCCH,2}^{(1)}$ | 1, 0 | 0, 1, 0, 1 |
| ACK, DTX, DTX, DTX | ACK, ACK, ACK, ACK | $n_{PUCCH,2}^{(1)}$ | 1, 0 | 0, 1, 0, 1 |
| ACK, ACK, ACK, ACK | ACK, DTX, DTX, DTX | $n_{PUCCH,2}^{(1)}$ | 1, 0 | 0, 1, 0, 1 |
| ACK, ACK, ACK, ACK | ACK, ACK, ACK, ACK | $n_{PUCCH,2}^{(1)}$ | 1, 0 | 0, 1, 0, 1 |
| NACK/DTX, any, any, any | ACK, DTX, DTX, DTX | $n_{PUCCH,2}^{(1)}$ | 0, 0 | 0, 0, 0, 1 |
| NACK/DTX, any, any, any | ACK, ACK, ACK, ACK | $n_{PUCCH,2}^{(1)}$ | 0, 0 | 0, 0, 0, 1 |
| (ACK, NACK/DTX, any, any), except for (ACK, DTX, DTX, DTX) | ACK, DTX, DTX, DTX | $n_{PUCCH,2}^{(1)}$ | 0, 0 | 0, 0, 0, 1 |
| (ACK, NACK/DTX, any, any), except for (ACK, DTX, DTX, DTX) | ACK, ACK, ACK, ACK | $n_{PUCCH,2}^{(1)}$ | 0, 0 | 0, 0, 0, 1 |
| ACK, ACK, ACK, NACK/DTX | NACK/DTX, any, any, any | $n_{PUCCH,1}^{(1)}$ | 1, 0 | 1, 1, 0, 0 |
| ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |
| ACK, ACK, NACK/DTX, any | NACK/DTX, any, any, any | $n_{PUCCH,1}^{(1)}$ | 0, 1 | 1, 0, 0, 0 |
| ACK, ACK, NACK/DTX, any | (ACK, NACK/DTX, any, any), except for (ACK, DTX, DTX, DTX) | $n_{PUCCH,1}^{(1)}$ | 0, 1 | 1, 0, 0, 0 |
| ACK, DTX, DTX, DTX | NACK/DTX, any, any, any | $n_{PUCCH,0}^{(1)}$ | 1, 1 | 0, 1, 0, 0 |
| ACK, DTX, DTX, DTX | (ACK, NACK/DTX, any, any), except for (ACK, DTX, DTX, DTX) | $n_{PUCCH,0}^{(1)}$ | 1, 1 | 0, 1, 0, 0 |
| ACK, ACK, ACK, ACK | NACK/DTX, any, any, any | $n_{PUCCH,0}^{(1)}$ | 1, 1 | 0, 1, 0, 0 |
| ACK, ACK, ACK, ACK | (ACK, NACK/DTX, any, any), except for (ACK, DTX, DTX, DTX) | $n_{PUCCH,0}^{(1)}$ | 1, 1 | 0, 1, 0, 0 |
| NACK, any, any, any | NACK/DTX, any, any, any | $n_{PUCCH,0}^{(1)}$ | 0, 0 | 0, 0, 0, 0 |
| NACK, any, any, any | (ACK, NACK/DTX, any, any), except for (ACK, DTX, DTX, DTX) | $n_{PUCCH,0}^{(1)}$ | 0, 0 | 0, 0, 0, 0 |
| (ACK, NACK/DTX, any, any), except for (ACK, DTX, DTX, DTX) | NACK/DTX, any, any, any | $n_{PUCCH,0}^{(1)}$ | 0, 0 | 0, 0, 0, 0 |
| (ACK, NACK/DTX, any, any), except for (ACK, DTX, DTX, DTX) | (ACK, NACK/DTX, any, any), except for (ACK, DTX, DTX, DTX) | $n_{PUCCH,0}^{(1)}$ | 0, 0 | 0, 0, 0, 0 |
| DTX, any, any, any | NACK/DTX, any, any, any | No Transmission | | 0, 0, 0, 0 |
| DTX, any, any, any | (ACK, NACK/DTX, any, any), except for (ACK, DTX, DTX, DTX) | No Transmission | | 0, 0, 0, 0 |

Here, $n_{PUCCH,0}^{(1)}$, $n_{PUCCH,1}^{(1)}$, $n_{PUCCH,2}^{(1)}$ and $n_{PUCCH,3}^{(1)}$ may be allocated as shown in Table 15.

A method in which a UE transmits ACK/NACK when the UE is configured as PUCCH format 3 mode in legacy TDD CA will now be described with reference to FIG. 15.

FIG. 15 illustrates the structure of PUCCH format 3 of a slot level. In PUCCH format 3, a plurality of pieces of A/N information is transmitted through joint coding (e.g. Reed-Muller coding, Tail-biting convolutional coding, etc.), block-spreading, and SC-FDMA modulation.

Referring to FIG. 15, one symbol sequence is transmitted in the frequency domain and orthogonal cover code (OCC)-based time-domain spreading is applied to the symbol sequence. Control signals of a plurality of UEs may be multiplexed to the same RB using an OCC. Specifically, 5 SC-FDMA symbols (i.e. UCI data parts) are generated from one symbol sequence ({d1,d2, . . . }) using a length-5 OCC (C1 to C5). The symbol sequence ({d1,d2, . . . }) may be a modulation symbol sequence or a codeword bit sequence.

An ACK/NACK payload for PUCCH format 3 is configured per CC and then configured ACK/NACK payloads are concatenated according to cell index order. HARQ-ACK feedback bits for a c-th serving cell (or DL CC) are given as $$o_{c,0}^{ACK} o_{c,1}^{ACK}, \ldots, o_{c,O_c^{ACK}-1}^{ACK} (c \geq 0).$$

$O_c^{ACK}$ represents the number of bits (i.e. size) of a HARQ-ACK payload for the c-th serving cell. When a transmission mode supporting single TB transmission is configured or spatial bundling is used for the c-th serving cell, $O_c^{ACK}$ may be set as $O_c^{ACK}=B_c^{DL}$. If a transmission mode supporting multi-TB (e.g. 2 TBs) transmission is configured and spatial bundling is not used, $O_c^{ACK}$ may be given as $O_c^{ACK}=2B_c^{DL}$. When HARQ-ACK feedback bits are transmitted through a PUCCH or when the HARQ-ACK feedback bits are transmitted through a PUSCH but W corresponding to the PUSCH is not present (e.g. in the case of an SPS based PUSCH), $B_c^{DL}$ is given as $B_c^{DL}=M$. M denotes the number of elements in set K defined in Table 4. If TDD UL-DL configurations are #1, #2, #3, #4, #6 and HARQ-ACK is transmitted through the PUSCH, $B_c^{DL}$ is given as $B_c^{DL}=W_{DAI}^{UL}$. Here, $W_{DAI}^{UL}$ denotes a value indicated by a UL DAI field in a UL grant PDCCH and is shorten to W. If a TDD UL-DL configuration is #5, then $B_c^{DL}=W_{DAI}^{UL}+4\lceil(U-W_{DAI}^{UL})/4\rceil$. U denotes a maximum value of Uc, Uc representing the total number of PDSCH(s) received in subframe n-k and (DL) SPS release PDCCHs in a c-th serving cell. Subframe n is a subframe in which HARQ-ACK is transmitted. $\lceil\ \rceil$ denotes a ceiling function.

When a transmission mode supporting transmission of a single TB is configured or spatial bundling is used for the c-th serving cell, the position of each ACK/NACK bit in the HARQ-ACK payload of the serving cell is given as $o_{c,DAI(k)-1}^{ACK}$. DAI(k) represents a DL DAI value detected from a DL subframe n-k. Meanwhile, when a transmission mode supporting transmission of multiple TBs (e.g. 2 TBs) and spatial bundling is not used for the c-th serving cell, positions of respective ACK/NACK bits in the HARQ-ACK payload of the serving cell corresponds to $o_{c,2DAI(k)-2}^{ACK}$ and $o_{c,2DAI(k)-1}^{ACK}$. $o_{c,2DAI(k)-2}^{ACK}$ represents HARQ-ACK for CW 0 and $o_{c,2DAI(k)-2}^{ACK}$ represents HARQ-ACK for CW 1. CW 0 and CW 1 respectively correspond to TB 0 and TB 1 or TB 1 and TB 0 according to swapping. When PUCCH format 3 is transmitted in a subframe configured for SR transmission, PUCCH format 3 is transmitted together with ACK/NACK bit and SR 1-bit.

Embodiment: A/N Transmission in Aggregation of CCs (or Cells) Having Different UL-DL Configurations In a TDD-based beyond LTE-A system, an aggregation of a plurality of CCs that operate with different UL-DL configurations may be considered. In this case, A/N timings (i.e. UL SF timings at which A/N is transmitted in response to DL data transmitted through DL SFs) configured for PCC and SCC may differ according to UL-DL configurations of the CCs. For example, UL SF timing at which A/N for the same DL SF timing (or DL data transmitted at the DL SF timing) is transmitted may be differently configured for PCC and SCC. A DL SF group corresponding to A/N feedback transmitted at the same UL SF timing may also be differently configured for PCC and SCC. In addition, with respect to the same SF timing, link directions (i.e. DL or UL) of PCC and SCC may be differently configured. As an example, a specific SF timing on SCC may be configured as a UL SF, while the corresponding SF timing on PCC may be configured as a DL SF.

In addition, in the TDD-based beyond LTE-A system, support for cross-CC scheduling in a CA situation based on different TDD UL-DL configurations (for convenience, referred to as different TDD CA) may be considered. In this case, different UL grant timings (DL SF timings at which UL grants that schedule UL transmission are transmitted) and different PHICH timings (DL SF timings at which PHICHs are transmitted in response to UL data) may be configured for a monitoring CC (MCC) and an SCC. For example, with respect to the same UL SF, a DL SF in which a UL grant/PHICH is transmitted may be differently configured for MCC and SCC. In addition, a UL SF group corresponding to UL grant or PHICH feedback is transmitted in the same DL SF may be differently configured for MCC and SCC. Link directions of MCC and SCC may also be differently configured with respect to the same SF timing. For example, a specific SF timing on SCC may be configured as a DL SF in which UL grant/PHICH is to be transmitted, while the corresponding SF timing on MCC may be configured as a UL SF.

When SF timing at which link directions of PCC and SCC are different (hereinafter, referred to as a collision SF) is present due to different TDD CA configurations, only a CC having a specific link direction of PCC/SCC or having a link direction of a specific CC (e.g. PCC) may be used at the corresponding SF timing due to a hardware configuration of a UE or other reasons/purposes. For convenience, this scheme is referred to as half-duplex (HD)-TDD CA. For example, when a collision SF is formed because a specific SF timing is configured as a DL SF on PCC and the corresponding SF timing is configured as a UL SF on an SCC, only PCC having a DL direction at the specific SF timing (i.e. a DL SF configured for PCC) may be used and SCC having a UL direction at the specific timing (i.e. a UL SF configured for SCC) may not be used (or vice versa). In this situation, in order to transmit, on the PCC, A/N feedback for DL data transmitted through DL SFs of all CCs, the same or different A/N timing (configured for a specific UL-DL configuration) may be applied per CC or an A/N timing configured for a specific UL-DL configuration may be commonly applied to all CCs. Here, the specific UL-DL configuration (hereinafter, referred to as a reference configuration (Ref-Cfg)) may be determined to be the same as that of PCC or SCC or may be determined to be another UL-DL configuration.

In the case of HD-TDD CA, the number of DL SFs corresponding to A/N feedback (hereinafter, A/N-DL SFs) at one UL SF timing may be differently configured for PCC and SCC. In other words, when the number of DL SFs (for convenience, A/N-DL SFs) corresponding to one UL SF is defined as M, M corresponding to one PCC UL SF may be differently/independently configured per CC (M per CC: Mc). In addition, when Ref-Cfg of a specific XCC (e.g. PCC or SCC) is not the same as a UL-DL configuration of PCC (i.e. PCC-Cfg), an A/N-DL SF index of the XCC configured at the PCC UL SF timing may be different from an A/N-DL SF index configured when an A/N timing of the original PCC-Cfg is applied. In particular, if a PUCCH resource linked to a CCE resource of a PDCCH for scheduling DL data is referred to as an implicit PUCCH, the implicit PUCCH for the specific XCC DL SF (PDCCH that schedules DL data to be transmitted in the XCC DL SF) may not be defined (in a PCC UL SF in which A/N for the specific XCC DL SF is to be transmitted) despite a cross-CC scheduling situation.

Figure 16:
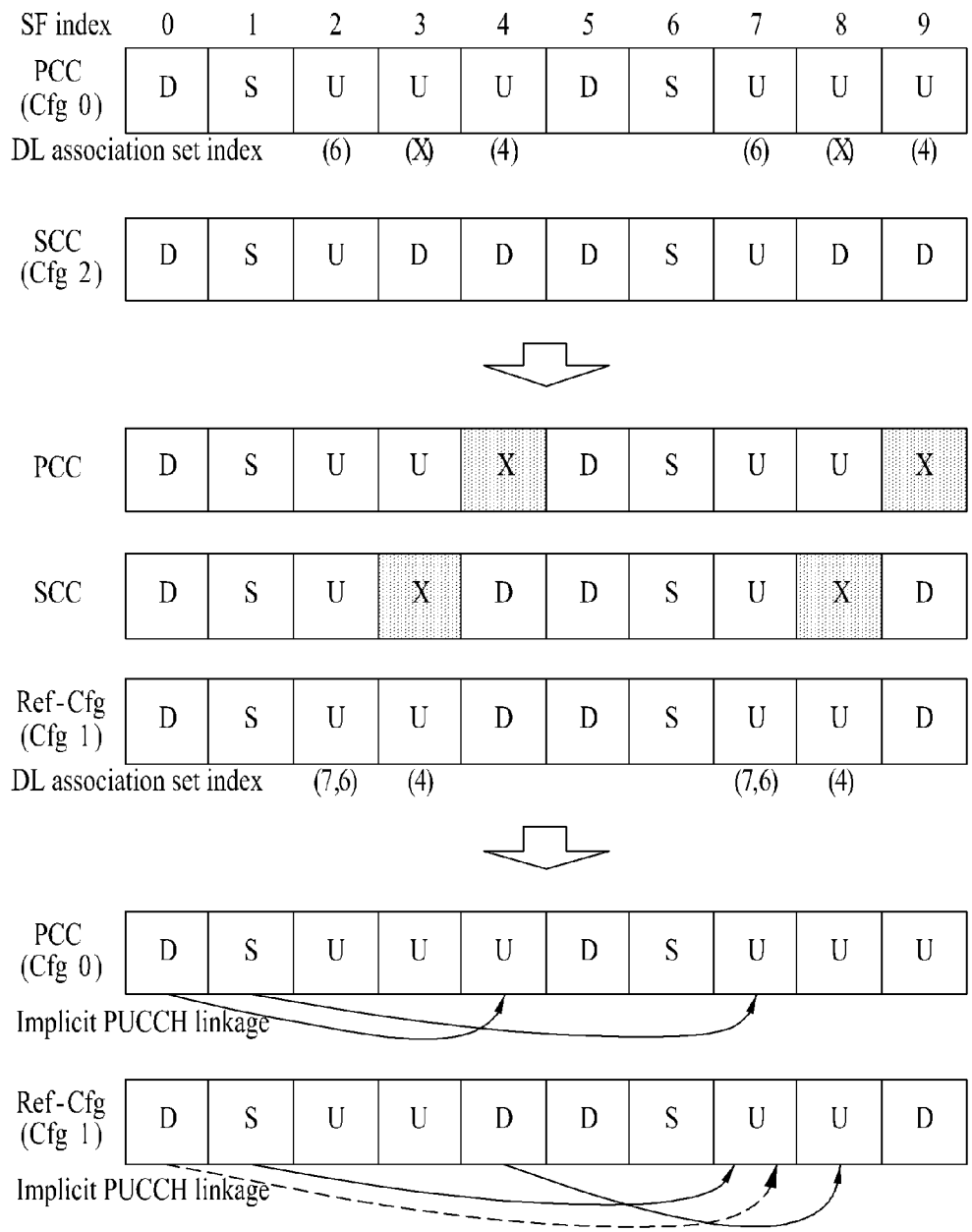
FIG. 16 illustrates an HD-TDD CA structure.

FIG. 16 illustrates tan HD-TDD CA structure. In FIG. 16, a shaded gray X indicates a CC (link direction) which is restricted for use in a collision SF and a dotted arrow indicates a DL SF to which an implicit PUCCH is not linked in a PCC UL SF.

Figure 17:
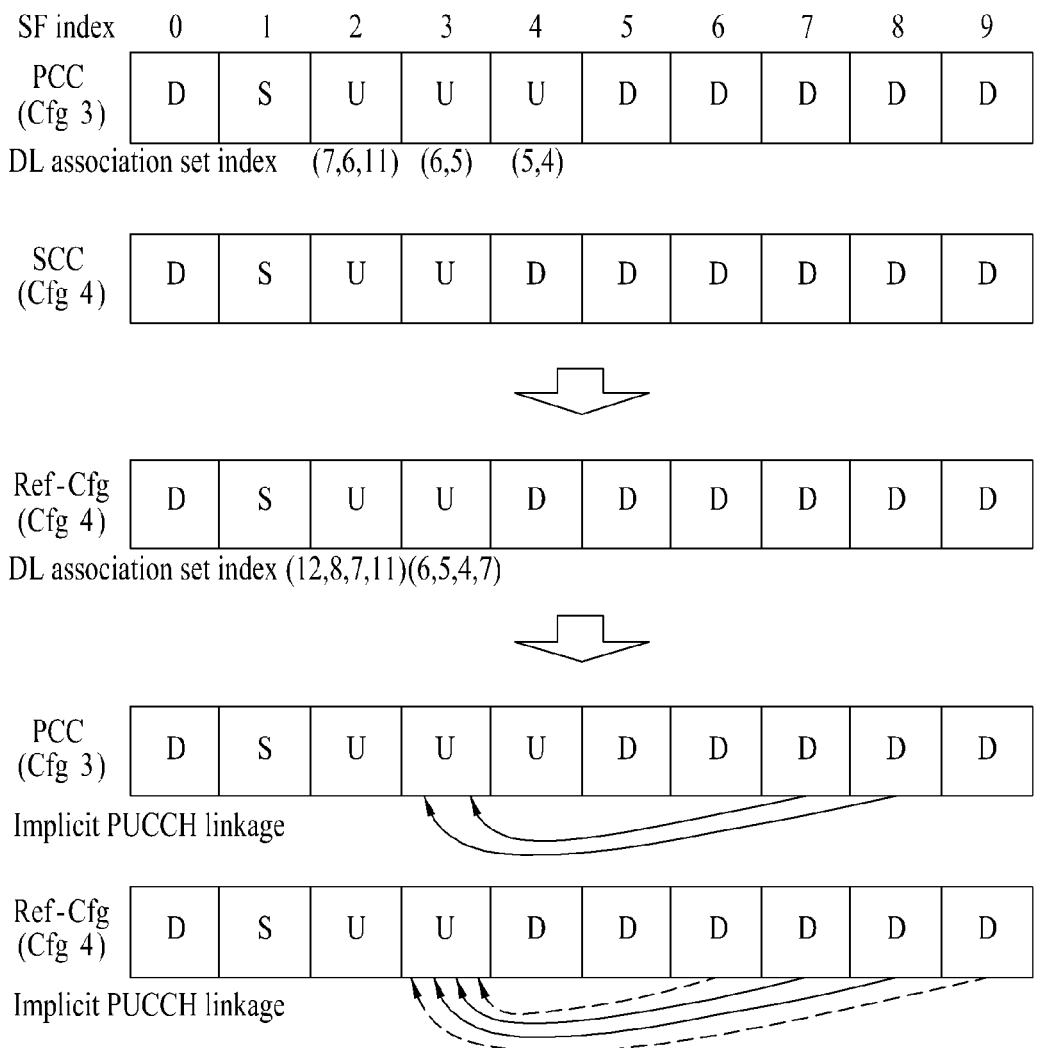
FIG. 17 illustrates an FD-TDD CA structure.

Meanwhile, allowing UL/DL simultaneous transmission and reception in a collision SF with different link directions for PCC and SCC may be considered. This scheme is referred to as full-duplex (FD)-TDD CA. Even in this case, in order to transmit A/N feedback for DL SFs of all CCs in one PCC UL SF, the same or different A/N timing (configured according to Ref-Cfg) may be applied per CC or A/N timing configured according to a specific Ref-Cfg may be commonly applied to all CCs. The Ref-Cfg may be the same as PCC-Cfg or SCC-Cfg or may be given as another different UL-DL Cfg. Additionally, in the FD-TDD CA structure, M may be differently/independently configured per CC with respect to one PCC UL SF and the implicit PUCCH resource may not be defined for an XCC DL SF (in a PCC UL SF corresponding to the XCC DL SF) despite a cross-CC scheduling situation. FIG. 17 illustrates an FD-TDD CA. Here, a dotted arrow indicates a DL SF to which the implicit PUCCH resource is not linked in a PCC UL SF.

As described above, due to introduction of various TDD CA situations (e.g. aggregation of CCs with different UL-DL configurations, HD-TDD CA, FD-TDD CA, etc.) and/or definition of Ref-Cfg according thereto, the number of DL subframes corresponding to a UL subframe in which A/N is transmitted (hereinafter, referred to as an A/N subframe) may be changed according to a CC (or a cell).

Embodiment 1: Configuration of Ref-Cfg

Hereinafter, a method is proposed for configuring Ref-Cfg according to a TDD CA structure and cross-CC or non-cross-CC scheduling. In this embodiment, a method starting with "solution F" may be applied to FD-TDD CA and a method starting with "solution H" may be applied to HD-TDD CA. Alternatively, each solution may be applied to both FD-TDD CA and HD-TDD CA irrespective of a TDD CA structure. For example, solution H2 is applicable to an FD-TDD CA structure. Meanwhile, in the present invention, D denotes a DL SF or a special SF and U denotes a UL SF. If a UL-DL configuration (UD-cfg) of a CC is (semi-) statically configured through broadcast information or higher layer signaling, a subframe configuration of the corresponding CC may be determined based on Table 1.

Hereinafter, if it is said that ACK/NACK timing configured for a specific CC (i.e. Ref-CC) or a specific UD-cfg (i.e. Ref-Cfg) is applied, this may mean that a parameter value corresponding to UD-cfg of the specific CC or the specific UD-cfg in Table 4 is used. Similarly, if it is said that UL grant or PHICH timing configured for a specific CC (i.e. Ref-CC) or a specific UD-cfg (i.e., Ref-Cfg) is applied, this may mean that a parameter value corresponding to UD-cfg of the specific CC or the specific UD-cfgs in Tables 5, 6, and 7 is used. For convenience, a Ref-CC (or Ref-Cfg) for ACK/NACK timing may be referred to as an A/N Ref-CC (or A/N Ref-Cfg) or a DL Ref-CC (or DL Ref-Cfg). Similarly, a Ref-CC (or Ref-Cfg) for UL grant or PHICH timing may be referred to as a UG/PHICH Ref-CC (or UG/PHICH Ref-Cfg) or a UL Ref-CC (or UL Ref-Cfg).

[Solution F1 for FD-TDD CA]
ACK/NACK for DL data transmitted on PCC
   ACK/NACK timing configured for PCC is applied.
ACK/NACK for DL data transmitted on SCC
   ACK/NACK timing of a UL-DL configuration having the smallest number of Ds (i.e. DL union) among UL-DL configurations in which D is configured in all SFs configured as D for PCC or SCC is applied. Equivalently, ACK/NACK timing of a UL-DL configuration having the largest number of Us (i.e. DL union) among UL-DL configurations in which D is configured in all SFs configured as D for PCC or SCC is applied. If it is assumed that UL-DL configurations of Table 1 are used, a DL union according to UL-DL configurations of two CCs is as follows.

TABLE 17

| Set # | (PCC UL-DL Cfg, SCC UL-DL Cfg) | DL-Union UL-DL Cfg |
|---|---|---|
| Set 1 | (0, 0) | 0 |
| | (1, 0), (1, 1), (1, 6) | 1 |
| | (2, 0), (2, 2), (2, 1), (2, 6) | 2 |
| | (3, 0), (3, 3), (3, 6) | 3 |
| | (4, 0), (4, 1), (4, 3), (4, 4), (4, 6) | 4 |
| | (5, 0), (5, 1), (5, 2), (5, 3), (5, 4), (5, 5), (5, 6) | 5 |
| | (6, 0), (6, 6) | 6 |
| Set 2 | (0, 1), (6, 1) | 1 |
| | (0, 2), (1, 2), (6, 2) | 2 |
| | (0, 3), (6, 3) | 3 |
| | (0, 4), (1, 4), (3, 4), (6, 4) | 4 |
| | (0, 5), (1, 5), (2, 5), (3, 5), (4, 5), (6, 5) | 5 |
| | (0, 6) | 6 |
| Set 3 | (3, 1), (1, 3) | 4 |
| | (3, 2), (4, 2), (2, 3), (2, 4) | 5 |

Table 17 is commonly applied in this specification in the case in which the DL union is determined. However, according to a specific CC combination for determining the DL union, (PCC UL-DL Cfg, SCC UL-DL Cfg) in Table 17 may be replaced with (PCC UL-DL Cfg, MCC UL-DL Cfg), (MCC UL-DL Cfg, SCC UL-DL Cfg), or (SCC1 UL-DL Cfg, SCC2 UL-DL Cfg).

[Solution F2 for FD-TDD CA]
ACK/NACK for DL data transmitted on PCC
   ACK/NACK timing configured for PCC is applied.
ACK/NACK for DL data transmitted on SCC
   Non-cross-CC scheduling: ACK/NACK timing configured by a DL union of PCC and SCC is applied.
   Cross-CC scheduling: ACK/NACK timing configured by a DL union of PCC and MCC is applied. MCC indicates a CC configured to cross-CC schedule an SCC.

A collision SF in which U is configured for MCC and D is configured for SCC is D: Scheduling for D of SCC may be abandoned/restricted. In this case, the collision SF may be excluded from available DL SFs in terms of ACK/NACK. In other words, ACK/NACK timing may not be defined in the collision SF. Accordingly, the collision SF may not be considered in a process of determining an ACK/NACK payload size, a process of determining an ACK/NACK bit position, a process of determining the number of HARQ processes, etc. As another example, the collision SF may always be treated as NACK, DTX, or NACK/DTX in terms of ACK/NACK.

[Solution F2-1 for FD-TDD CA]
ACK/NACK for DL data transmitted on PCC
  ACK/NACK timing configured for PCC is applied.
ACK/NACK for DL data transmitted on SCC
  Non-cross-CC scheduling: ACK/NACK timing configured by a DL union of PCC and SCC is applied.
  Cross-CC scheduling: ACT/NACK timing configured by a DL union of PCC and ULU-cfg is applied. ULU-cfg is a virtual UL-DL configuration in which U is configured in all SFs configured as U for SCC or MCC and D is configured in the other SFs (i.e. in SFs configured as D for SCC and MCC). Alternatively, when a DL-UL configuration having the smallest number of Us among DL-UL configurations in which U is configured in all SFs configured as D for SCC or MCC is defined as "UL union", ACK/NACK timing configured by a DL union of PCC and the UL union may be applied.
    A collision SF in which U is configured for MCC and D is configured for SCC: Scheduling for D of SCC may be abandoned/restricted. (In this case, the collision SF may be excluded from available DL SFs or may be processed as NACK (or DTX or NACK/DTX)).

[Solution F2-2 for FD-TDD CA]
ACK/NACK for DL data transmitted on PCC
  ACK/NACK timing configured for PCC is applied.
ACK/NACK for DL data transmitted on SCC
  Non-cross-CC scheduling: ACK/NACK timing configured by a DL union of PCC and SCC is applied.
  Cross-CC scheduling: ACK/NACK timing configured by a DL union of PCC and SCC.
    A collision SF in which U is configured for MCC and D is configured for SCC: Scheduling for D of SCC may be abandoned/restricted. (In this case, the collision SF may be excluded from available DL SFs or may be processed as NACK (or DTX or NACK/DTX)).

[Solution F3 for FD-TDD CA]
ACK/NACK for DL data transmitted on PCC
  ACK/NACK timing configured for PCC is applied.
ACK/NACK for DL data transmitted on SCC (Alt F3-1: Case in which SCC is configured to be scheduled by another CC is defined as cross-CC scheduling.)
  Non-cross-CC scheduling: ACK/NACK timing configured by a DL union of PCC and SCC is applied.
  Cross-CC scheduling: ACK/NACK timing configured for PCC is applied.
    A collision SF in which U is configured for PCC or MCC and D is configured for SCC: Scheduling for D of SCC may be abandoned/restricted. (In this case, the collision SF may be excluded from available DL SFs or may be processed as NACK (or DTX or NACK/DTX)).

ACK/NACK for DL data transmitted on SCC (Alt F3-2: Only the case in which SCC is configured to be scheduled by PCC is defined as cross-CC scheduling.)
  Non-cross-CC scheduling: ACK/NACK timing configured by a DL union of PCC and SCC is applied.
    A collision SF in which U is configured for MCC and D is configured for SCC: Scheduling for D of SCC may be abandoned/restricted. (In this case, the collision SF may be excluded from available DL SFs or may be processed as NACK (or DTX or NACK/DTX).)
  Cross-CC scheduling: ACK/NACK timing configured for PCC is applied.
    A collision SF in which U is configured for PCC and D is configured for SCC: Scheduling for D of SCC may be abandoned/restricted. (In this case, the collision SF may be excluded from available DL SFs or may be processed as NACK (or DTX or NACK/DTX).)

[Solution H1 for HD-TDD CA]
ACK/NACK for DL data transmitted on PCC
  ACK/NACK timing configured for PCC is applied.
ACK/NACK for DL data transmitted on SCC
  ACK/NACK timing configured for PCC is applied.
    A collision SF in which U is configured for PCC and D is configured for SCC: Scheduling for D of SCC may be abandoned/restricted. (In this case, the collision SF may be excluded from available DL SFs or may be processed as NACK (or DTX or NACK/DTX).)

[Solution H2 for HD-TDD CA]
ACK/NACK for DL data transmitted on PCC
  ACK/NACK timing configured for PCC is applied.
ACK/NACK for DL data transmitted on SCC
  Non-cross-CC scheduling: ACK/NACK timing configured for PCC is applied.
    A collision SF in which U is configured for PCC and D is configured for SCC: Scheduling for D of SCC may be abandoned/restricted. (In this case, the collision SF may be excluded from available DL SFs or may be processed as NACK (or DTX or NACK/DTX).)
  Cross-CC scheduling: ACK/NACK timing configured for PCC is applied.
    A collision SF in which U is configured for PCC or MCC and D is configured for SCC: Scheduling for D of SCC may be abandoned/restricted. (In this case, the collision SF may be excluded from available DL SFs or may be processed as NACK (or DTX or NACK/DTX).)

[Solution H2-1 for HD-TDD CA]
ACK/NACK for DL data transmitted on PCC
  ACK/NACK timing configured for PCC is applied.
ACK/NACK for DL data transmitted on SCC
  Non-cross-CC scheduling: ACK/NACK timing configured by a DL union of PCC and SCC is applied.
    A collision SF in which U is configured for PCC and D is configured for SCC: Scheduling for D of SCC may be abandoned/restricted. (In this case, the collision SF may be excluded from available DL SFs or may be processed as NACK (or DTX or NACK/DTX).)
  Cross-CC scheduling: ACK/NACK timing configured by a DL union of PCC and SCC is applied.

A collision SF in which U is configured for PCC or MCC and D is configured for SCC: Scheduling for D of SCC may be abandoned/restricted. (In this case, the collision SF may be excluded from available DL SFs or may be processed as NACK (or DTX or NACK/DTX)).

[Solution H2-2 for HD-TDD CA]
ACK/NACK for DL data transmitted on PCC
　ACK/NACK timing configured for PCC is applied.
ACK/NACK for DL data transmitted on SCC (Alt H2-2-1: Case in which SCC is configured to be scheduled by another CC is defined as cross-CC scheduling.)
　Non-cross-CC scheduling: ACK/NACK timing configured by a DL union of PCC and SCC is applied.
　　A collision SF in which U is configured for PCC and D is configured for SCC: Scheduling for D of SCC may be abandoned/restricted. (In this case, the collision SF may be excluded from available DL SFs or may be processed as NACK (or DTX or NACK/DTX).)
　Cross-CC scheduling: ACK/NACK timing configured for PCC is applied.
　　A collision SF in which U is configured for PCC or MCC and D is configured for SCC: Scheduling for D of SCC may be abandoned/restricted. (In this case, the collision SF may be excluded from available DL SFs or may be processed as NACK (or DTX or NACK/DTX).)
ACK/NACK for DL data transmitted on SCC (Alt H2-2-2: Only the case in which SCC is configured to be scheduled by PCC is defined as cross-CC scheduling.)
　Non-cross-CC scheduling: ACK/NACK timing configured by a DL union of PCC and SCC is applied.
　　A collision SF in which U is configured for PCC or MCC and D is configured for SCC: Scheduling for D of SCC may be abandoned/restricted. (In this case, the collision SF may be excluded from available DL SFs or may be processed as NACK (or DTX or NACK/DTX).)
　Cross-CC scheduling: ACK/NACK timing configured for PCC is applied.
　　A collision SF in which U is configured for PCC and D is configured for SCC: Scheduling for D of SCC may be abandoned/restricted. (In this case, the collision SF may be excluded from available DL SFs or processed as NACK (or DTX or NACK/DTX).)

[Solution H3 for HD-TDD CA]
ACK/NACK for DL data transmitted on PCC
　ACK/NACK timing configured for PCC is applied.
ACK/NACK for DL data transmitted on SCC
　Non-cross-CC scheduling: ACK/NACK timing configured by a DL union of PCC and SCC is applied.
　　A collision SF in which U is configured for PCC and D is configured for SCC: Scheduling for D of SCC may be abandoned/restricted. (In this case, the collision SF may be excluded from available DL SFs or may be processed as NACK (or DTX or NACK/DTX).)
　Cross-CC scheduling: ACK/NACK timing configured by a DL union of PCC and MCC is applied.
　　A collision SF in which U is configured for PCC or MCC and D is configured for SCC: Scheduling for D of SCC may be abandoned/restricted. (In this case, the collision SF may be excluded from available DL SFs or may be processed as NACK (or DTX or NACK/DTX).)

Meanwhile, in the above proposed scheme, when cross-CC scheduling is configured (especially, in the case in which available DL SFs are determined according to a link direction relationship of PCC/MCC/SCC), a method for determining SFs in which both PCC and SCC are configured as D to be available DL SFs irrespective of a link direction of MCC may be applied. (In this case, the corresponding SFs may be used to determine the maximum number of DL HARQ processes). This scheme has the advantage of a simplified configuration in HARQ process related modules and hardware of a UE despite somewhat excessive partitioning of a HARQ reception buffer of the UE (which deteriorates HARQ reception buffer use efficiency), relative to the proposed scheme in which available DL SFs depend upon link directions of PCC/MCC/SCC.

Meanwhile, considering an HD-TDD CA structure (especially, a structure in which only a link direction of a PCC is always used in a collision SF), in an SF in which S is configured for the PCC and D (and/or S) is configured for an SCC (when a DL SF and a special SF are distinguished by D and S, respectively), successful DL data detection/reception may not be easily performed in D (and/or S) of the SCC due to a DL/UL switching operation in the PCC and thus DL data scheduling for D (and/or S) of the SCC may be additionally restricted or may not be permitted. Accordingly, it is additionally proposed to restrict or omit scheduling for D (and/or S) of an SCC even in a collision SF in which S is configured for a PCC and D (and/or S) is configured for an SCC (i.e. a collision SF is excluded from available DL SFs). Based on this proposal, solutions H1 to H3 considering the case in which PCC is not MCC may be revised as follows.

[Solution H1 for HD-TDD CA]—Revised
ACK/NACK for DL data transmitted on PCC
　ACK/NACK timing configured for PCC is applied.
ACK/NACK for DL data transmitted on SCC
　ACK/NACK timing configured for PCC is applied.
　　A BS may support/perform DL scheduling for SCC and a UE may attempt to detect/receive DL data, only in an SF in which (PCC, SCC)=(D, D or S) or (PCC, SCC)=(S, S) (i.e. the SF is determined to be an available DL SF).

[Solution H2 for HD-TDD CA]—Revised
ACK/NACK for DL data transmitted on PCC
　ACK/NACK timing configured for PCC is applied.
ACK/NACK for DL data transmitted on SCC
　Non-cross-CC scheduling: ACK/NACK timing configured for PCC is applied.
　　The BS may support/perform DL scheduling for SCC and the UE may attempt to detect/receive DL data, only in an SF in which (PCC, SCC)=(D, D or S) or (PCC, SCC)=(S, S) (i.e. the SF is determined to be an available DL SF).
　Cross-CC scheduling: ACK/NACK timing configured for PCC is applied.
　　The BS may support/perform DL scheduling for SCC and the UE may attempt to detect/receive DL data, only in an SF in which (PCC, MCC, SCC)=(D, D or S, D or S) or (PCC, MCC, SCC)=(S, D or S, S) (i.e. the SF is determined to be an available DL SF).

[Solution H2-1 for HD-TDD CA]—Revised
ACK/NACK for DL data transmitted on PCC
　ACK/NACK timing configured for PCC is applied.
ACK/NACK for DL data transmitted on SCC
　Non-cross-CC scheduling: ACK/NACK timing configured by a DL union of PCC and SCC is applied.

The BS may support/perform DL scheduling for SCC and the UE may attempt to detect/receive DL data, only in an SF in which (PCC, SCC)=(D, D or S) or (PCC, SCC)=(S, S) (i.e. the SF is determined to be an available DL SF).

Cross-CC scheduling: ACK/NACK timing configured by a DL union of PCC and SCC is applied.

The BS may support/perform DL scheduling for SCC and the UE may attempt to detect/receive DL data, only in an SF in which (PCC, MCC, SCC)= (D, D or S, D or S) or (PCC, MCC, SCC)=(S, D or S, S) (i.e. the SF is determined to be an available DL SF).

[Solution H2-2 for HD-TDD CA]—Revised

ACK/NACK for DL data transmitted on PCC
ACK/NACK timing configured for PCC is applied.

ACK/NACK for DL data transmitted on SCC

Alt H2-2-1: all Cases in which SCC is Configured to be Scheduled by Another CC is Defined as Cross-CC Scheduling.

Non-cross-CC scheduling: ACK/NACK timing configured by a DL union of PCC and SCC is applied.

The BS may support/perform DL scheduling for SCC and the UE may attempt to detect/receive DL data, only in an SF in which (PCC, SCC)=(D, D or S) or (PCC, SCC)=(S, S) (i.e. the SF is determined to be an available DL SF).

Cross-CC scheduling: ACK/NACK timing configured for PCC is applied.

The case in which PCC does not correspond to MCC: The BS may support/perform DL scheduling for SCC and the UE may attempt to detect/receive DL data, only in an SF in which (PCC, MCC, SCC)=(D, D or S, D or S) or (PCC, MCC, SCC)=(S, D or S, S) (i.e. the SF is determined to be an available DL SF).

The case in which PCC corresponds to MCC: The BS may support/perform DL scheduling for SCC and the UE may attempt to detect/receive DL data, only in an SF in which (PCC, SCC)=(D, D or S) or (PCC, SCC)=(S, S) (i.e. the SF is determined to be an available DL SF).

Alt H2-2-2: Only the Case in which SCC is Configured to be Scheduled by PCC is Defined as Cross-CC Scheduling Non-cross-CC scheduling: ACK/NACK timing configured by a DL union of PCC and SCC is applied.

The case in which MCC correspond to SCC: The BS may support/perform DL scheduling for SCC and the UE may attempt to detect/receive DL data, only in an SF in which (PCC, SCC)=(D, D or S) or (PCC, SCC)=(S, S) (i.e. the SF is determined to be an available DL SF).

The case in which MCC does not correspond to SCC: The BS may support/perform DL scheduling for SCC and the UE may attempt to detect/receive DL data, only in an SF in which (PCC, MCC, SCC)=(D, D or S, D or S) or (PCC, MCC, SCC)=(S, D or S, S) (i.e. the SF is determined to be an available DL SF).

Cross-CC scheduling: ACK/NACK timing configured for PCC is applied.

The BS may support/perform DL scheduling for SCC and the UE may attempt to detect/receive DL data, only in an SF in which (PCC, SCC)=(D, D or S) or (PCC, SCC)=(S, S) (i.e. the SF is determined to be an available DL SF).

Alt H2-2-3: all Cases in which SCC is Configured to be Scheduled by Another CC is Defined as Cross-CC Scheduling Non-cross-CC scheduling: ACK/NACK timing configured by a DL union of PCC and SCC is applied.

The BS may support/perform DL scheduling for SCC and the UE may attempt to detect/receive DL data, only in an SF in which (PCC, SCC)=(D, D or S) or (PCC, SCC)=(S, S) (i.e. the SF is determined to be an available DL SF).

Cross-CC scheduling: ACK/NACK timing configured for PCC is applied.

The BS may support/perform DL scheduling for SCC and the UE may attempt to detect/receive DL data, only in an SF in which (PCC, SCC)=(D, D or S) or (PCC, SCC)=(S, S) (i.e. the SF is determined to be an available DL SF).

[Solution H3 for FD-TDD CA]—Revised

ACK/NACK for DL data transmitted on PCC
ACK/NACK timing configured for PCC is applied.

ACK/NACK for DL data transmitted on SCC

Non-cross-CC scheduling: ACK/NACK timing configured by a DL union of PCC and SCC is applied.

The BS may support/perform DL scheduling for SCC and the UE may attempt to detect/receive DL data, only in an SF in which (PCC, SCC)=(D, D or S) or (PCC, SCC)=(S, S) (i.e. the SF is determined to be an available DL SF).

Cross-CC scheduling: ACK/NACK timing configured by a DL union of PCC and MCC is applied.

The BS may support/perform DL scheduling for SCC and the UE may attempt to detect/receive DL data, only in an SF in which (PCC, MCC, SCC)=(D, D or S, D or S) or (PCC, MCC, SCC)=(S, D or S, S) (i.e. the SF is determined to be an available DL SF).

In the above proposed scheme, the UE may operate under the assumption that DL data is not scheduled/transmitted in D (or S) in which scheduling is abandoned/restricted (i.e. in an unavailable DL SF). For example, the UE may omit a DL data detection/reception process in an unavailable DL SF. In addition, A/N feedback/timing corresponding to the unavailable DL SF may not be defined/configured. Alternatively, the UE may operate under the assumption that DL data is scheduled/transmitted only in D (or S) of SCC in which scheduling is not abandoned/restricted (i.e. in an available DL SF). For example, the UE may perform a DL data detection/reception process only in an available DL SF. Further, only A/N feedback/timing corresponding to the available DL SF is defined/configured.

In terms of DL data detection/reception, a UE operation may be defined as follows.

A collision SF in which U is configured for MCC and D is configured for SCC: The UE abandons/restricts scheduling for D of SCC.

The UE attempts to detect/receive DL data through D of SCC only in an SF in which D is configured for both MCC and SCC.

A collision SF in which U is configured for PCC or MCC and D is configured for SCC: The UE abandons/restricts scheduling for D of SCC.

The UE attempts to detect/receive DL data through D of SCC only in an SF in which all of D is configured for all of PCC, MCC and SCC.

A collision SF in which U is configured for PCC and D is configured for SCC: The UE abandons/restricts scheduling for D of SCC.

The UE attempts to detect/receive DL data through D of SCC only in an SF in which D is configured for both PCC and SCC.

In addition, A/N timing for SCC in FD-TDD CA may be applied as follows.

Non-cross-CC scheduling: Only ACK/NACK timing for SF timing at which D (or S) is configured for SCC is extracted from among ACK/NACK timings of Ref-Cfg and applied.

Cross-CC scheduling: Only ACK/NACK timing for SF timing at which D (or S) is configured for both SCC and MCC (DL data scheduling for SCC is defined/permitted only at the corresponding SF timing) is extracted from among ACK/NACK timings of Ref-Cfg and applied.

In addition, ACK/NACK timing for SCC in HD-TDD CA may be applied as follows.

Non-cross-CC scheduling: Only ACK/NACK timing for SF timing at which (PCC, SCC)=(D, D or S) or (PCC, SCC)=(S, S) is extracted from among ACK/NACK timings of Ref-Cfg and applied.

Cross-CC scheduling: 1) Only ACK/NACK timing for SF timing at which (PCC, MCC, SCC)=(D, D or S, D or S) or (PCC, MCC, SCC)=(S, D or S, S) is extracted from among ACK/NACK timings of Ref-Cfg and applied when PCC is not MCC and only ACK/NACK timing for SF timing at which (PCC, SCC)=(D, D or S) or (PCC, SCC)=(S, S) (DL data scheduling for SCC is defined/permitted in the corresponding SF timing) is extracted from among ACK/NACK timings of Ref-Cfg and applied when PCC is MCC, or 2) Only ACK/NACK timing for SF timing at which (PCC, SCC)=(D, D or S) or (PCC, SCC)=(S, S) is extracted from among ACK/NACK timings of Ref-Cfg and applied.

Figure 18:
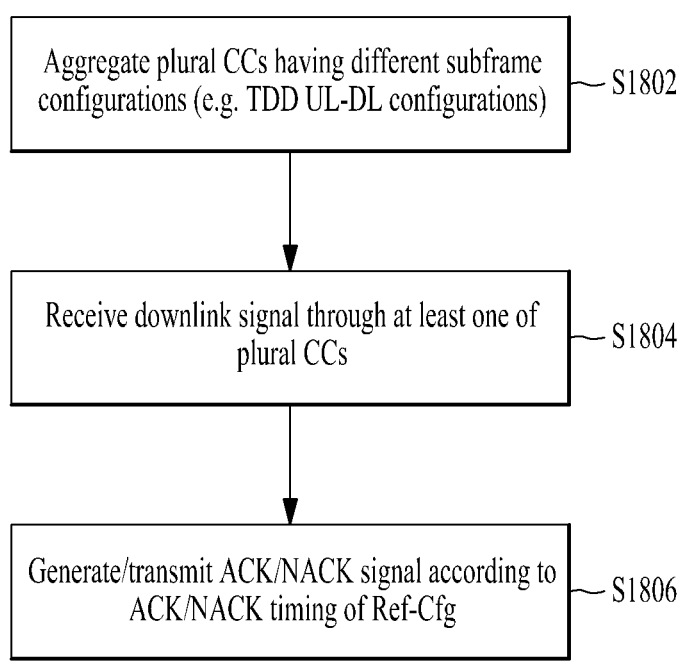
FIG. 18 illustrates exemplary A/N transmission according to the present invention.

FIG. 18 illustrates exemplary ACK/NACK transmission according to the present invention. Although FIG. 18 is illustrated and explained in terms of a UE for convenience, it is apparent that a counterpart operation of the UE may be performed by a BS.

Referring to FIG. 18, the UE aggregates a plurality of CCs (S1802). The CCs may have different subframe configurations (e.g. different TDD UL-DL configurations). Next, the UE receives a DL signal (e.g. a PDSCH and an SPS release PDCCH) necessary for ACK/NACK feedback on at least one of the CCs (S1804). In this case, the UE may generate/transmit an ACK/NACK signal according to ACK/NACK timing of Ref-CFg of the corresponding CC (S1806). More specifically, the ACK/NACK signal may be generated/transmitted according to a configured ACK/NACK transmission method (e.g. PUCCH format 1b+channel selection, PUCCH format 3, etc.). In addition, the UE may determine the number of HARQ-ACK bits per CC, a HARQ-ACK payload size, a HARQ-ACK bit position, or the number of HARQ processes according to ACK/NACK timing of Ref-Cfg (Table 4).

Meanwhile, when the DL signal is received on a PCC, ACK/NACK timing configured for the PCC is applied (i.e. Ref-Cfg=PCC Cfg). On the other hand, when the DL signal is received on an SCC, ACK/NACK Ref-Cfg may be determined according to the above exemplary schemes (e.g. F1 to F3 and H1 to H3 (including revised examples)).

Embodiment 2: Number of HARQ Processes and Reception Buffer Size

Hereinafter, a method will be proposed for determining the maximum number of supportable DL HARQ processes when ACK/NACK timing is applied in a CA situation of CCs having different subframe configurations. The CA situation of CCs having different subframe configurations includes, for example, a CA situation between an FDD CC and a TDD CC or a TDD CA situation between different UL-DL Cfgs. For convenience, a description will be given hereinafter centering upon a method for determining the maximum number of supportable DL HARQ processes when Ref-Cfg based ACK/NACK timing is applied in a TDD CA situation between different UL-DL Cfgs. A basic principle of the proposed method is to determine the maximum number of DL HARQ processes of a corresponding CC according to how many "available DL SFs" of a CC configured to conform to ACK/NACK timing of Ref-Cfg are included within a duration including the maximum number of DL SFs (i.e. a duration for determining the maximum number of DL HARQ processes, referred to as an max-HARQ-RTT) among durations of initial DL data timing (initial transmission-DL; inTx-DL) configured in Ref-Cfg→ACK/NACK feedback→retransmission DL data timing (retransmission-DL; reTx-DL).

Table 18 shows combinations of (inTx-DL, reTx-DL) of maxHARQ-RTT per UL-DL Cfg. A plurality of combinations of (inTx-DL, reTx-DL) corresponding to maxHARQ-RTT may be present in one Ref-Cfg. According to this proposal, a maximum value of the numbers of available DL SFs (of a CC configured to conform to ACK/NACK timing of corresponding Ref-Cfg) included in each duration of maxHARQ-RTT may be determined to be the maximum number of DL HARQ processes (of the corresponding CC). In an FDD CC, maxHARQ-RTT may be fixed to a specific value (e.g. 8). For example, in the FDD CC, a combination of (inTx-DL, reTx-DL) corresponding to maxHARQ-RTT may be given as (SF #n, SF #(n+8)).

TABLE 18

| UL-DL Cfg | maxHARQ-RTT #1 (inTx-DL, reTx-DL) | maxHARQ-RTT #2 (inTx-DL, reTx-DL) |
|---|---|---|
| 0 | (SF #6, SF #(10 + 6)) | (SF #1, SF #(10 + 1)) |
| 1 | (SF #5, SF #(10 + 6)) | (SF #0, SF #(10 + 1)) |
| 2 | (SF #4, SF #(10 + 6)) | (SF #9, SF #(20 + 1)) |
| 3 | (SF #1, SF #(10 + 6)) | — |
| 4 | (SF #0, SF #(10 + 6)) | — |
| 5 | (SF #9, SF #(20 + 6)) | — |
| 6 | (SF #5, SF #(10 + 6)) | (SF #0, SF #(10 + 1)) |

Figure 19:
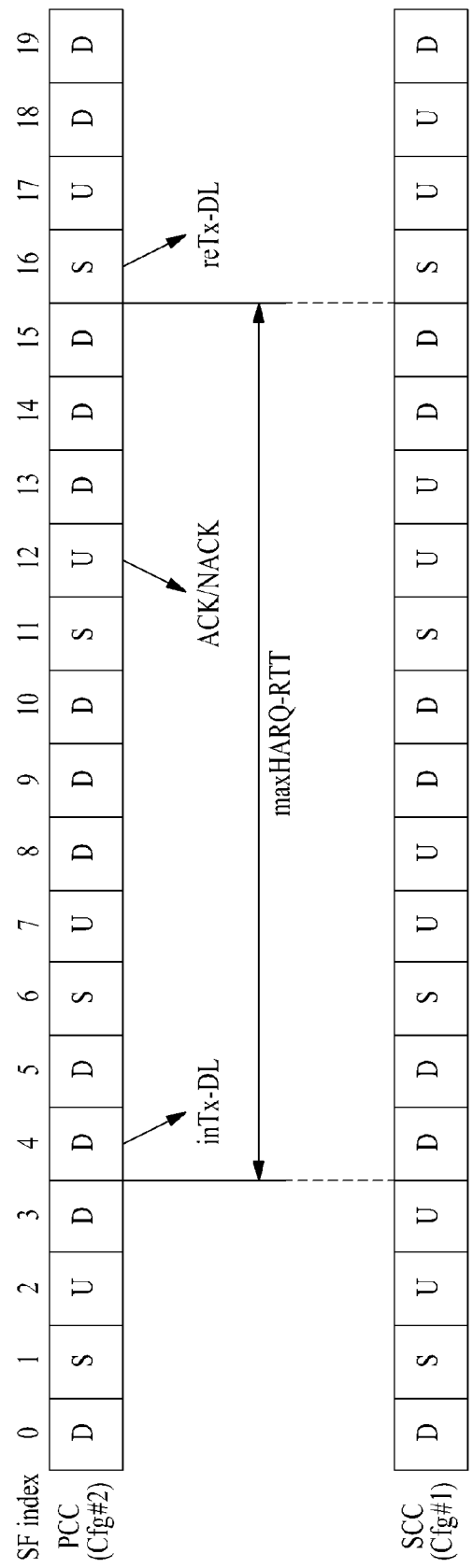
FIGS. 19 and 20 illustrate examples of determining the maximum number of DL HARQ processes according to the present invention.

FIG. 19 illustrates an example of determining the maximum number of DL HARQ processes according to the present invention. In this example, it is assumed that PCC conforms to Cfg #2, SCC conforms to Cfg #1, and solution F1 is applied.

Referring to FIG. 19, in the case of PCC, since a UL-DL configuration thereof (i.e. Cfg #2) is configured as Ref-Cfg for ACK/NACK timing, the maximum number of DL HARQ processes is determined to be 10. In this case, (inTx-DL, reTx-DL) of maxHARQ-RTT may be (SF #4, SF #(10+6)). In the case of SCC, Cfg #2, which is a UL-DL configuration (i.e. DL union) having the smallest number of Ds among UL-DL configurations in which D is configured in all SFs configured as D for PCC (Cfg #2) or SCC (Cfg #1), is Ref-Cfg. Since the number of DL SFs of SCC (Cfg #1) within a duration of (inTx-DL, reTx-DL)=(SF #4, SF #(10+6)) corresponding to maxHARQ-RTT of Cfg #2 is 8, the maximum number of DL HARQ processes of SCC may be determined to be 8.

Figure 20:
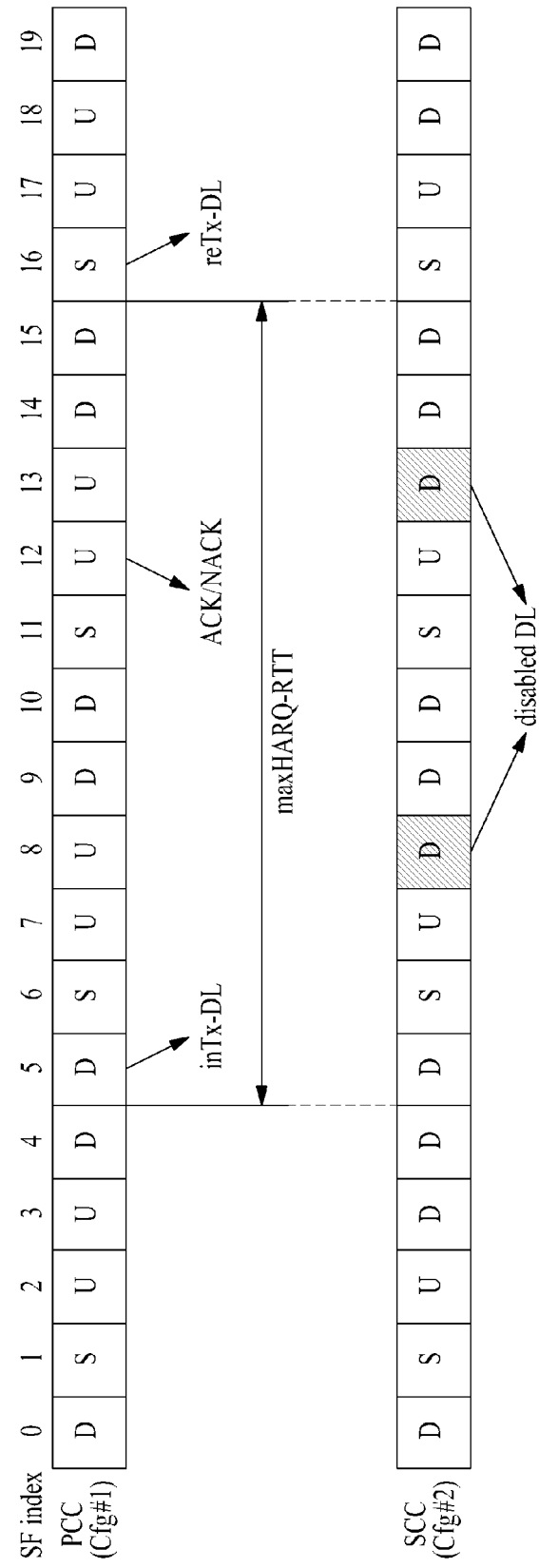

FIG. 20 illustrates another example of determining the maximum number of DL HARQ processes according to the present invention. In this example, it is assumed that PCC is Cfg #1, SCC is Cfg #2, and solution F2 is performed.

Referring to FIG. 20, when non-cross-CC scheduling is configured, in the case of PCC, since a UL-DL configuration (i.e. Cfg #1) of PCC is configured as Ref-Cfg, the maximum number of DL HARQ processes is determined to be 7. In the case of SCC, since Cfg #2, which is a DL union of PCC (Cfg #1) and SCC (Cfg #2), is configured as Ref-Cfg, the maximum number of DL HARQ processes may be determined to be 10. Meanwhile, if PCC is configured to cross-CC schedule SCC, a UL-DL configuration of PCC (i.e. Cfg #1) is configured as Ref-Cfg with respect to both PCC and SCC. The number of available DL SFs of SCC (i.e. the number of DL SFs of SCC except for a collision SF #8 and SF #(10+3) in which U is configured for PCC and D is configured for SCC) within a duration of (inTx-DL, reTx-DL)=(SF #5, SF #(10+6)) corresponding to maxHARQ-RTT of Cfg #1 is 7. Accordingly, the maximum numbers of DL HARQ processes of PCC and SCC may be determined to be 7 and 7, respectively.

With respect to solution F2, a situation in which PCC, SCC1, and SCC2 are respectively configured as Cfg #2, Cfg #1, and Cfg #2 is described by way of example. When non-cross-CC scheduling is configured, since Cfg #2 is configured as Ref-Cfg for PCC, Cfg #2 corresponding to a DL union of PCC and SCC1 is configured as Ref-Cfg for SCC1 and Cfg #2 corresponding to a DL union of PCC and SCC2 is configured as Ref-Cfg for SCC2. Accordingly, the maximum numbers of DL HARQ processes of PCC, SCC1, and SCC2 are respectively determined to be 10, 8, and 10. Meanwhile, when PCC is configured to (cross-CC) schedule only PCC and SCC1 is configured to (cross-CC) schedule SCC1 and SCC2, since PCC and SCC1 have a non-cross CC scheduling relationship, the maximum numbers of DL HARQ processes may be determined to be 10 and 8, respectively. In the case of SCC2, Cfg #2 corresponding to a DL union of PCC and SCC1 (i.e. MCC for SCC2) is configured as Ref-Cfg. The number of available DL SFs of SCC2 (i.e. the number of DL SFs of SCC2 except for a collision SF #8 and SF#(10+3) in which U is configured for SCC1 and D is configured for SCC2) within a duration of (inTx–DL, reTx–DL)=(SF #4, SF #(10+6)) corresponding to maxHARQ-RTT of Cfg #2 is 8. Accordingly, the maximum number of DL HARQ processes of SCC2 may be determined to be 8.

With respect to solution F2-1, a situation in which PCC, SCC1, and SCC2 are respectively configured as Cfg #4, Cfg #5, and Cfg #3 is described by way of example. When non-cross-CC scheduling is configured, Cfg #4 is configured as Ref-Cfg for PCC, Cfg #5 corresponding to a DL union of PCC and SCC1 is configured as Ref-Cfg for SCC1, and Cfg #4 corresponding to a DL union of PCC and SCC2 is configured as Ref-Cfg for SCC2. Accordingly, the maximum numbers of DL HARQ processes of PCC, SCC1, and SCC2 are respectively determined to be 12, 15, and 10 (the number of DL SFs of Cfg #3 of SCC2 within a duration of max-HARQ-RTT of Cfg #4 corresponding to Ref-Cfg). Meanwhile, when PCC is configured to (cross-CC) schedule only PCC and SCC1 is configured to (cross-CC) schedule SCC1 and SCC2, since PCC and SCC1 have a non-cross CC scheduling relationship, the maximum numbers of DL HARQ processes may be determined to be 12 and 15, respectively. In the case of SCC2, Cfg #4, which is a DL union of ULU-cfg (corresponding to Cfg #3 in this example) of SCC2 and SCC1 (configured as MCC of SCC2) and PCC, is configured as Ref-Cfg. The number of available DL SFs of SCC2 (i.e. the number of DL SFs of SCC2 except for a collision SF (which is not present in this example) in which U is configured for SCC1 and D is configured for SCC2) within a duration of (inTx-DL, reTx-DL)=(SF #0, SF #(10+6)) corresponding to maxHARQ-RTT of Cfg #4 is 10. Accordingly, the maximum number of DL HARQ processes of SCC2 may be determined to be 10. If solution F2 is applied, Cfg #5 corresponding to a DL union of SCC1 and PCC is configured as Ref-Cfg. Since the number of available DL SFs of SCC2 within a duration of (inTx-DL, reTx-DL)=(SF #9, SF #(20+6)) corresponding to maxHARQ-RTT of Cfg #5 is 11, the maximum number of DL HARQ processes of SCC2 may be determined to be 11.

In solution F2-2, the number of DL HARQ processes per CC may be determined by a method similar to solution F2. Particularly, in the case of SCC, a DL union of a PCC and SCC is configured as Ref-Cfg and the number of available DL SFs of SCC within a duration of maxHARQ-RTT of Ref Cfg may be determined to be the maximum number of DL HARQ processes of the corresponding SCC. Here, the available DL SFs are DL SFs of SCC except for collision SFs in which U is configured for MCC and D is configured for SCC.

In solution F3, the number of DL HARQ processes per CC may be determined by a method similar to solution F2. Particularly, in the case of SCC, Cfg of PCC is configured as Ref-Cfg and the number of available DL SFs of SCC within a duration of maxHARQ-RTT of Ref Cfg may be determined to be the maximum number of DL HARQ processes of the corresponding SCC. Here, the available DL SFs are DL SFs of SCC except for collision SFs in which U is configured for PCC or MCC and D is configured for SCC.

Solution H1 is described by way of example when PCC is configured as Cfg #3 and SCC is configured as Cfg #4. Cfg of PCC (i.e. Cfg #3) is configured as Ref-Cfg for both PCC and SCC and the number of available DL SFs of SCC (Cfg #4) (i.e. DL SFs of SCC except for collision SFs #4 and #(10+4) in which U is configured for PCC and D is configured for SCC) within a duration of (inTx-DL, reTx-DL)=(SF #1, SF #(10+6)) corresponding to maxHARQ-RTT of Cfg #3 is 9. Accordingly, the maximum numbers of DL HARQ processes of PCC and SCC may be determined to be 9 and 9, respectively.

Solution H2 is described by way of example when PCC, SCC1, and SCC2 are configured as Cfg #4, Cfg #3 and Cfg #5, respectively. In the case of non-cross-CC scheduling, Cfg of PCC (i.e. Cfg #4) is configured as Ref-Cfg for all CCs. The number of available DL SFs of SCC1 (i.e. DL SFs of SCC1 except for collision SFs in which U is configured for PCC and D is configured for SCC1 (which are not present in this example)) within a duration of (inTx-DL, reTx-DL)=(SF #0, SF #(10+6)) corresponding to max-HARQ-RTT of Cfg #4 is 10 and the number of DL SFs of SCC2 (i.e. DL SFs of SCC2 except for collision SFs SF #3 and SF #(10+3) in which U is configured for PCC and D is configured for SCC2) is 12. Accordingly, the maximum numbers of DL HARQ processes of PCC, SCC1, and SCC2 may be determined to be 12, 10, and 12, respectively. When the PCC is configured to (cross-CC) schedule only PCC and SCC1 is configured to (cross-CC) schedule SCC1 and SCC2, since PCC and SCC1 have a non-cross-CC scheduling relationship, the maximum numbers of DL HARQ processes for PCC and SCC1 may be determined to be 12 and 10, respectively. In the case of SCC2, Cfg of PCC (i.e. Cfg #4) is configured as Ref-Cfg. The number of available DL SFs of SCC2 (i.e. DL SFs of SCC2 except for collision SFs #3, #4, #(10+3), and #(10+4) in which U is configured for PCC or SCC1 and D is configured for SCC2) within a duration of (inTx-DL, reTx-DL)=(SF #0, SF #(10+6)) corresponding to maxHARQ-RTT of Cfg #4 is 10. Accordingly, the maximum number of DL HARQ processes of SCC2 may be determined to be 10.

In solutions H2-1, H2-2, and H3, a method similar to solution H2 may be used to determine the number of DL HARQ processes per CC. Particularly, in the case of SCC, when non-cross CC scheduling is configured, a DL union of PCC and SCC is configured as Ref-Cfg and the number of available DL SFs of SCC (i.e. DL SFs of SCC except for collision SFs in which U is configured for PCC and D is configured for SCC) within a duration of maxHARQ-RTT of Ref-Cfg may be determined to be the maximum number of DL HARQ processes of SCC. When cross-CC scheduling is configured, a DL union (solution H2-1) of PCC and SCC, Cfg of PCC (solution H2-2), or a DL union (solution H3) of PCC and MCC configured to cross-CC-schedule SCC is configured as Ref-Cfg. The number of available DL SFs of SCC (i.e. DL SFs of SCC except for collision SFs in which U is configured for PCC or MCC is D is configured for SCC) within a duration of maxHARQ-RTT of Ref-Cfg may be determined to be the maximum number of DL HARQ processes of SCC.

Alternatively, when SCC and PCC have different UL-DL Cfgs, a method is proposed for restricting MCC configured to cross-CC schedule SCC only to a CC having the same UL-DL Cfg as SCC or a CC having the same UL-DL Cfg as PCC, in order to facilitate DL HARQ timing configuration and allocation of the number of DL HARQ processes (associated with DL grant PDCCH transmission and ACK/NACK feedback) in HD-TDD CA and FD-TDD CA situations. Meanwhile, when SCC and PCC have the same UL-DL Cfg, MCC may be determined to be a CC having the same UL-DL Cfg as SCC/PCC or a CC having a different UL-DL Cfg from SCC/PCC.

In the case of specific CA (characteristically, CCs having different SF structures (e.g. CA of FDD CC and TDD CC)) including CA of TDD CCs having different UL-DL Cfgs, different maximum numbers of DL HARQ processes may be allocated, unlike a legacy method, to CCs (according to whether cross-CC scheduling is configured (and/or a TDD CA (FD or HD) structure is applied). Hence, a parameter $n_{SB}$ (Equation 4 of the legacy method) for determining the number/range of reception soft channel bits that a UE needs to store per CC may be corrected in consideration of the fact that the maximum number of DL HARQ processes (MDL_HARQ) may be differently allocated according to each CC (and/or according to whether cross-CC scheduling is configured (and/or according to whether a TDD CA (FD or HD) structure is applied)).

Equation 5 represents a reception soft buffer size proposed by the present invention.

Specifically, the present invention proposes a method for calculating $n_{SB}$ determine the number/range of reception soft channel bits that need to be stored per CC through Equations 5 and 6 when the maximum number of DL HARQ processes of CC #n (n=0, ..., $N_{cells}^{DL}$) is defined as $M_{DL\_HARQ,n}$.

In Equations 5 and 6, $M_{DL\_HARQ,n}$ may vary according to whether cross-CC scheduling is configured (and/or whether a TDD CA (FD or HD) structure is applied) as described above. To calculate $n_{SB}$, $M_{DL\_HARQ}$ may be set to a different value according to whether cross-CC scheduling is configured (and/or whether a TDD CA (FD or HD) structure is applied) even when Equation 4 of the legacy method is applied (e.g. a maximum value of the numbers of DL HARQ processes per CC is applied to $M_{DL\_HARQ}$).

$$n_{SB} = \min\left(N_{cb}, \left\lfloor \frac{N'_{soft}}{C \cdot \sum_{n=0}^{N_{cells}^{DL}-1} \min(M_{DL\_HARQ,n}, M_{limit}) \cdot K_{MIMO}} \right\rfloor\right) \quad \text{[Equation 5]}$$

$$n_{SB} = \min\left(N_{cb}, \left\lfloor \frac{N'_{soft}}{C \cdot \min\left(\sum_{n=0}^{N_{cells}^{DL}-1} M_{DL\_HARQ,n}, N_{cells}^{DL} \cdot M_{limit}\right) \cdot K_{MIMO}} \right\rfloor\right) \quad \text{[Equation 6]}$$

Here, $N_{cb}$, $N'_{soft}$, C, $K_{MIMO}$, and $M_{limit}$ are parameters described with reference to Equations 1 to 4. $N_{cells}^{DL}$ denotes the number of DL cells and $M_{DL\_HARQ,n}$ denotes the maximum number of DL HARQ processes of DL cell n.

As another method, the maximum number of DL HARQ processes, $M_{DL\_HARQ,n}$, and parameter $M_{DL\_HARQ}$ for each CC may be differently determined according to whether scheduling configuration (i.e. cross-CC or non-cross-CC) for SCC is configured, whether a UE is permitted to perform simultaneous transmission and reception (i.e. FD-TDD CA or HD-TDD CA), and/or whether a DL SF set relationship between PCC and SCC is Case A (i.e. a DL SF set of PCC is a superset of a DL SF set of SCC), Case B (i.e. a DL SF set of PCC is a subset of a DL SF set of SCC), or Case C (i.e. a DL SF set of PCC is neither a superset nor subset of a DL SF set of SCC).

For convenience, the proposed method for determining the maximum number of DL HARQ processes and parameter $M_{DL\_HARQ}$ of a CC according to the number of available DL SFs of the CC configured to conform to ACK/NACK timing of Ref-Cfg within a duration of maxHARQ-RTT configured for Ref-Cfg is referred to as "actual-DL based HARQp". Meanwhile a method for determining the maximum number of DL HARQ processes (Table 8) and parameter $M_{DL\_HARQ}$ defined in Ref-Cfg to be the maximum number of DL HARQ processes, $M_{DL\_HARQ,n}$, and parameter $M_{DL\_HARQ}$ of the CC configured to conform to ACK/NACK timing of Reg-Cfg is referred to as "Ref-Cfg-based HARQp".

As a desirable example of the proposed method, actual-DL based HARQp may be applied in cross-CC scheduling and Ref-Cfg-based HARQp may be applied in non-cross-CC scheduling. In cross-CC scheduling, when cross-SF scheduling (i.e. a method for transmitting a DL grant and DL data scheduled from the DL grant in different SFs) is not permitted, DL SFs which are excluded from available DL SFs may frequently occur. In this case, an application of Ref-Cfg-based HARQp may cause excessive over-dimensioning of a HARQ reception buffer of the UE and thus may deteriorate HARQ reception buffer use efficiency. In the case of non-cross-CC scheduling, since over-dimensioning is insignificant or ignorable relative to the case of cross-CC scheduling, HARQ process related modules and hardware configuration of the UE can be simplified by reducing the number of values of parameter $M_{DL\_HARQ}$ using Ref-Cfg-based HARQp. For a similar reason/purpose, for example, Ref-Cfg-based HARQp may be applied in FD-TDD CA and actual-DL based HARQp may be applied in HD-TDD CA. Similarly, Ref-Cfg-based HARQp may be applied in case A and actual-DL based HARQp may be applied in Case B or C.

As a similar approach, in a situation in which parameter $M_{DL\_HARQ}$ per CC is determined according to actual-DL based HARQp, Ref-Cfg-based HARQp, or a combination of the two schemes, an equation for calculating $n_{SB}$ may be differently applied according to size of $M_{DL\_HARQ}$ of each CC (i.e. whether $M_{DL\_HARQ}$ of PCC (i.e. $M_{DL\_HARQ(P)}$) is larger or smaller than $M_{DL\_HARQ}$ Of SCC (i.e. $M_{DL\_HARQ(S)}$)), scheduling configuration for SCC (i.e. cross-CC or non-cross-CC), permission/non-permission of simultaneous transmission and reception of the UE (i.e. FD-TDD CA or HD-TDD CA), and/or DL SF set relationship between SCC and PCC (i.e. Case A, B or C). For convenience, a method for equally partitioning a HARQ reception buffer per CC by applying parameter $M_{DL\_HARQ}$ per CC to $M_{DL\_HARQ}$ of Equation 4 is referred to as "per-CC equal buffer". On the other hand, a method for equally partitioning a HARQ reception buffer per HARQ process by applying parameter $M_{DL\_HARQ}$ per CC to $M_{DL\_HARQ.n}$ of Equation 5 or 6 is referred to as "per-HARQp equal buffer".

As an example of the proposed method, per-HARQp equal buffer may be applied when $M_{DL\_HARQ(P)} \geq M_{DL\_HARQ(S)}$ and per-CC equal buffer may be applied when $M_{DL\_HARQ(P)} \leq M_{DL\_HARQ(S)}$. Alternatively, per-HARQp equal buffer may be applied when $\min(M_{DL\_HARQ(P)}, M_{limit}) \geq \min(M_{DL\_HARQ(S)}, M_{limit})$ and per-CC equal buffer may be applied when $\min(M_{DL\_HARQ(P)}, M_{limit}) \leq \min(M_{DL\_HARQ(S)}, M_{limit})$ (here, when there is a plurality of SCCs, $M_{DL\_HARQ(S)}$ may be a minimum value or a maximum value of values of $M_{DL\_HARQ}$ of SCCs). If $M_{DL\_HARQ(P)} \geq M_{DL\_HARQ(S)}$ or $\min(M_{DL\_HARQ(P)}, M_{limit}) \geq \min(M_{DL\_HARQ(S)}, M_{limit})$, then the number of HARQ processes of PCC is greater than that of SCC. In this case, if per-CC equal buffer is applied, DL data reception performance of PCC may be deteriorated because a reception buffer size per HARQ process for PCC is smaller than that for SCC. On the contrary, when $M_{DL\_HARQ(P)} \leq M_{DL\_HARQ(S)}$ or $\min(M_{DL\_HARQ(P)}, M_{limit}) \leq \min(M_{DL\_HARQ(S)}, M_{limit})$, i.e., when the number of HARQ processes of PCC is smaller than that of SCC, DL data transmitted on PCC can be better protected than that transmitted on SCC by applying per-CC equal buffer. For a similar reason/purpose, per-HARQp equal buffer and per-CC equal buffer may be applied to the HD-TDD CA structure and the FD-TDD CA structure, respectively; to cross-CC scheduling and non-cross-CC scheduling, respectively, (in this case, if there is a plurality of SCCs, cross-CC scheduling may be considered as a situation in which all SCCs or at least one SCC is cross-CC scheduled); or to Case A and Case B or C, respectively (if there is a plurality of SCCs, Case A may be considered as a situation in which all SCCs or at least one SCC has the relationship of Case A with PCC).

Figure 21:
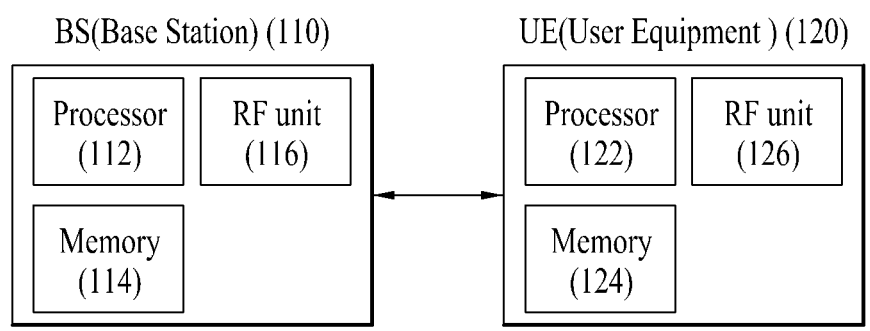
FIG. 21 illustrates a BS and a UE to which the present invention is applicable.

FIG. 21 illustrates a BS and a UE to which the present invention is applicable. When a radio communication system includes a relay, communication over a backhaul link is performed between the BS and the relay and communication over an access link is performed between the relay and the UE. Accordingly, the BS or the UE illustrated in FIG. 21 may be replaced with the relay according to circumstance.

Referring to FIG. 21, a radio communication system includes a BS 110 and a UE 120. The BS 110 includes a processor 112, a memory 114, and a radio frequency (RF) unit 116. The processor 112 may be configured to implement procedures and/or methods proposed by the present invention. The memory 114 is connected to the processor 112 and stores information related to operations of the processor 112. The RF unit 116 is connected to the processor 112 and transmits and/or receives RF signals. The UE 120 includes a processor 122, a memory 124, and an RF unit 126. The processor 122 may be configured to implement procedures and/or methods proposed by the present invention. The memory 124 is connected to the processor 122 and stores information related to operations of the processor 122. The RF unit 126 is connected to the processor 122 and transmits and/or receives RF signals. The BS 110 and/or the UE 120 may have a single antenna or multiple antennas.

The embodiments of the present invention described hereinabove are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the present document, a description has been made of a data transmission and reception relationship between a UE and a BS. Here, a specific operation described as being performed by the BS may be performed by an upper node of the BS. Namely, it is apparent that, in a network comprised of a plurality of network nodes including the BS, various operations performed for communication with the UE may be performed by the BS, or network nodes other than the BS. The term BS may be replaced with the term fixed station, Node B, eNode B (eNB), access point, etc. The term UE may be replaced with the term mobile station (MS), mobile subscriber station (MSS), etc.

The embodiments of the present invention may be achieved by various means, for example, hardware, firmware, software, or a combination thereof. In a hardware configuration, an embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are to be embraced therein.

INDUSTRIAL APPLICABILITY

The present invention may be used for radio communication apparatuses such as a UE, a relay, and an eNB.

The invention claimed is:

1. A method for transmitting an uplink signal by a communication apparatus in a wireless communication system, the method comprising:
   configuring a primary cell of a first time division duplex uplink-downlink (TDD UL-DL) configuration and a secondary cell of a second TDD UL-DL configuration, wherein the second TDD UL-DL configuration is different from the first TDD UL-DL configuration; and
   receiving a downlink signal requiring hybrid ARQ acknowledgement (HARQ-ACK) feedback within subframe #n-k of the secondary cell; and
   transmitting acknowledgement information for the downlink signal in a subframe #n via a physical uplink control channel (PUCCH) or a physical uplink shared channel (PUSCH),
   wherein k is an element of K:$\{k_0, k_1, \ldots k_{M-1}\}$ of a specific TDD UL-DL configuration within a TDD UL-DL configuration set,
   wherein K:$\{k_0, k_1, \ldots k_{M-1}\}$ is a parameter set defined by table 1, and the TDD UL-DL configuration set includes TDD UL-DL configurations defined by table 2,
   if the secondary cell is scheduled by the same cell, the specific TDD UL-DL configuration is a TDD UL-DL configuration having a smallest number of DL and special subframes among one or more TDD UL-DL configurations in which subframes configured as DL and S in the primary and secondary cells are all configured as DL and S, and
   if the secondary cell is scheduled by another cell, the specific TDD UL-DL configuration is the first TDD UL-DL configuration of the primary cell,

TABLE 1

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

TABLE 2

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | where D denotes a DL subframe, S denotes a special subframe, and U denotes a UL subframe.

2. The method of claim 1, wherein the acknowledgement information for the downlink signal is transmitted on the primary cell via the PUCCH.

3. The method of claim 1, wherein the downlink signal includes a physical downlink shared channel (PDSCH) and a physical downlink control channel (PDCCH) indicating a semi-persistent scheduling (SPS) release.

4. The method of claim 1, wherein the downlink signal can be scheduled only in a subframe timing at which a subframe combination of the primary cell and the secondary cell is (DL subframe, DL or special subframe) or (special subframe, special subframe) within the subframe set of the secondary cell.

5. The method of claim 1, wherein the communication apparatus is configured to operate in a half duplex time division duplex (HD-TDD) carrier aggregation.

6. A communication apparatus for transmitting an uplink signal in a wireless communication system, the communication apparatus comprising:
   a radio frequency (RF) unit; and
   a processor,
   wherein the processor is configured to
      configure a primary cell of a first time division duplex uplink-downlink (TDD UL-DL) configuration and a secondary cell of a second TDD UL-DL configuration,
      wherein the second TDD UL-DL configuration is different from the first TDD UL-DL configuration,
      receive a downlink signal requiring hybrid ARQ acknowledgement (HARQ-ACK) feedback within subframe #n-k of the secondary cell, and
      transmit acknowledgement information for the downlink signal in a subframe #n via a physical uplink control channel (PUCCH) or a physical uplink shared channel (PUSCH),
   wherein k is an element of K:$\{k_0, k_1, \ldots k_{M-1}\}$ of a specific TDD UL-DL configuration within a TDD UL-DL configuration set,
   wherein K:$\{k_0, k_1, \ldots k_{M-1}\}$ is a parameter set defined by table 1, and the TDD UL-DL configuration set includes TDD UL-DL configurations defined by table 2,
   if the secondary cell is scheduled by the same cell, the specific TDD UL-DL configuration is a TDD UL-DL configuration having a smallest number of DL and special subframes among one or more TDD UL-DL configurations in which subframes configured as DL and S in the primary and secondary cells are all configured as DL and S, and
   if the secondary cell is scheduled by another cell, the specific TDD UL-DL configuration is the first TDD UL-DL configuration of the primary cell,

TABLE 1

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |

TABLE 1-continued

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

TABLE 2

| Uplink-downink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | where D denotes a DL subframe, S denotes a special subframe, and U denotes a UL subframe.

7. The communication apparatus of claim 6, wherein the acknowledgement information for the downlink signal is transmitted on the primary cell via the PUCCH.

8. The communication apparatus of claim 6, wherein the downlink signal includes a physical downlink shared channel (PDSCH) and a physical downlink control channel (PDCCH) indicating a semi-persistent scheduling (SPS) release.

9. The communication apparatus of claim 6, wherein the downlink signal can be scheduled only in a subframe timing at which a subframe combination of the primary cell and the secondary cell is (DL subframe, DL or special subframe) or (special subframe, special subframe) within the subframe set of the secondary cell.

10. The communication apparatus according to claim 6, wherein the communication apparatus is configured to operate in a half duplex time division duplex (HD-TDD) carrier aggregation.

* * * * *